United States Patent
Engerman

(10) Patent No.: US 11,752,861 B2
(45) Date of Patent: Sep. 12, 2023

(54) ELECTRIC DRIVE AXLE GEAR TRAIN AND METHOD FOR MANUFACTURING SAID GEAR TRAIN

(71) Applicant: Dana Automotive Systems Group, LLC, Maumee, OH (US)

(72) Inventor: Eric M. Engerman, Novi, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 76 days.

(21) Appl. No.: 17/444,549

(22) Filed: Aug. 5, 2021

(65) Prior Publication Data

US 2021/0362591 A1    Nov. 25, 2021

Related U.S. Application Data

(63) Continuation of application No. 16/794,654, filed on Feb. 19, 2020, now Pat. No. 11,148,526.

(51) Int. Cl.
*F16H 3/091*    (2006.01)
*B60K 17/08*    (2006.01)
(Continued)

(52) U.S. Cl.
CPC ............. *B60K 17/046* (2013.01); *B60K 1/00* (2013.01); *B60K 17/02* (2013.01); *B60K 17/08* (2013.01);
(Continued)

(58) Field of Classification Search
CPC .......... B60K 17/00–08; B60K 17/0806; B60K 2001/001; F16H 2200/2035; F16H 2200/2005; F16H 3/091
See application file for complete search history.

(56) References Cited

U.S. PATENT DOCUMENTS

| 10,479,185 B2 | 11/2019 | Kleid |
| 2012/0198962 A1 | 8/2012 | Houle |

(Continued)

FOREIGN PATENT DOCUMENTS

| CN | 110081152 A | * | 8/2019 | |
| KR | 20120081011 A | * | 7/2012 | ............. F16H 3/006 |

(Continued)

OTHER PUBLICATIONS

Engerman, E., "Electric Drive Axle System With a Self-Indexing Clutch and Method for Operation of Said Clutch," U.S. Appl. No. 16/794,703, filed Feb. 19, 2020, 51 pages.

(Continued)

*Primary Examiner* — Ernesto A Suarez
*Assistant Examiner* — Lillian T Nguyen
(74) *Attorney, Agent, or Firm* — McCoy Russell LLP

(57) ABSTRACT

Methods and systems for an electric drive axle of a vehicle are provided. A gear train in an electric drive axle system includes, in one example, an input shaft configured to rotationally couple to an electric motor-generator and including a first gear and an intermediate shaft including a second gear rotationally coupled to the first gear and a third gear and a fourth gear each configured to rotationally couple to a separate gear on an output shaft. In this example, the second gear, the third gear, and the fourth gear have different sizes, the third gear includes an axial extension having at outer surface, and an interior surface of the second gear circumferentially surrounds at least a portion of the outer surface of the axial extension.

20 Claims, 13 Drawing Sheets

(51) Int. Cl.
  B60K 17/04    (2006.01)
  F16H 63/34    (2006.01)
  B60K 17/02    (2006.01)
  B60K 1/00     (2006.01)
  *B60K 6/387*      (2007.10)
  *B60K 6/26*       (2007.10)
  *B60K 6/365*      (2007.10)

(52) U.S. Cl.
  CPC ......... *F16H 3/091* (2013.01); *F16H 63/3416* (2013.01); *B60K 6/26* (2013.01); *B60K 6/365* (2013.01); *B60K 6/387* (2013.01); *B60K 2001/001* (2013.01); *B60Y 2200/91* (2013.01); *B60Y 2200/92* (2013.01); *F16H 2200/0034* (2013.01); *F16H 2702/04* (2013.01)

(56) References Cited

U.S. PATENT DOCUMENTS

| | | | |
|---|---|---|---|
| 2014/0004987 A1* | 1/2014 | Sato | B60K 17/02 475/150 |
| 2014/0262675 A1 | 9/2014 | Sugiyama et al. | |
| 2016/0138659 A1* | 5/2016 | Strandberg | F16D 3/227 475/150 |
| 2018/0204940 A1 | 7/2018 | Schultz et al. | |
| 2019/0113120 A1* | 4/2019 | Sten | F16H 1/28 |
| 2019/0301576 A1* | 10/2019 | Harada | F16H 37/0813 |

FOREIGN PATENT DOCUMENTS

| | | | | |
|---|---|---|---|---|
| WO | WO-2019121635 A1 * | 6/2019 | ............... | B60K 1/00 |
| WO | WO-2019161395 A1 * | 8/2019 | ........... | B60B 35/122 |

OTHER PUBLICATIONS

Engerman, E., "Electric Drive Axle System With Multi-Speed Gear Train," U.S. Appl. No. 16/794,632, filed Feb. 19, 2020, 37 pages.

Engerman, E. et al., "Electric Axle System With Removable Planetary Gear Assembly," U.S. Appl. No. 16/794,643, filed Feb. 19, 2020, 50 pages.

Nahrwold, T., "Sand Mode System and Method for a Vehicle," U.S. Appl. No. 16/794,647, filed Feb. 19, 2020, 33 pages.

Nahrwold, T., "Dig Mode System and Method for Vehicle," U.S. Appl. No. 16/794,618, filed Feb. 19, 2020, 36 pages.

Wesolowski, S. et al., "System and Method for Charachterizing a Clutch," U.S. Appl. No. 16/794,675, filed Feb. 19, 2020, 43 pages.

Nahrwold, T. et al., "Systems and Method for Adjusting Vehicle Performance," U.S. Appl. No. 16/794,783, filed Feb. 19, 2020, 34 pages.

Engerman, E., "Vehicle System With Multiple Electric Drive Axles," U.S. Appl. No. 16/795,263, filed Feb. 19, 2020, 43 pages.

Engerman, E., "Electric Drive Axle With Lubrication System," U.S. Appl. No. 16/795,280, filed Feb. 19, 2020, 47 pages.

\* cited by examiner

ELECTRIC DRIVE AXLE GEAR TRAIN AND METHOD FOR MANUFACTURING SAID GEAR TRAIN

CROSS REFERENCE TO RELATED APPLICATION

The present application is a continuation of U.S. patent application Ser. No. 16/794,654, entitled "ELECTRIC DRIVE AXLE GEAR TRAIN AND METHOD FOR MANUFACTURING SAID GEAR TRAIN", and filed on Feb. 19, 2020. The entire contents of the above-listed application are hereby incorporated by reference for all purposes.

TECHNICAL FIELD

The present disclosure relates to electric drive axle gear trains in vehicles and methods for manufacturing the gear trains.

BACKGROUND

Electrified axles have been incorporated into electric as well as hybrid vehicles to provide or augment vehicle propulsion. The electrified axles have included gearboxes providing a targeted gear ratio for torque transfer between the electric motor and drive wheels. However, the inventors have recognized that previous electric drive axles have exhibited drawbacks related to gearbox packaging and manufacturing. For instance, manufacturing techniques used to achieve relatively precise gear grinding have previously presented impediments to compactly packaging gears on gearbox shafts. Consequently, in certain prior gearbox designs, gear precision may be at odds with packaging the gears in a space efficient manner.

SUMMARY

To overcome at least some of the aforementioned challenges a gear train is provided. In one example, the gear train includes an input shaft configured to rotationally couple to an electric motor-generator. The gear train includes a first gear and an intermediate shaft having a second gear rotationally coupled to the first gear. A third gear and a fourth gear, each configured to rotationally couple to a separate gear on an output shaft, are also positioned on the intermediate shaft. Additionally, the second gear, the third gear, and the fourth gear have different sizes. The third gear includes an axial extension having at outer surface. An interior surface of the second gear circumferentially surrounds at least a portion of the outer surface of the axial extension. This intermediate shaft gear arrangement allows the gears to be constructed with a relatively high amount of accuracy in a compact arrangement, if desired. Consequently, noise, vibration, and harshness (NVH) in the gear train can be reduced and the space efficiency of the gear train can be increased.

In another example, the gear train may include a park gear coupled to the output shaft axially between a fifth and sixth gear. The fifth gear is rotationally coupled to the fourth gear and the sixth gear is rotationally coupled to the third gear. In this way, the park gear may be compactly arranged in the gear train, further increasing the gear train's space efficiency.

In another example, a method for manufacturing a gear train in an electric drive axle system is provided. The method includes forming a first gear on an outer surface of an intermediate shaft in the gear train, press-fitting a second gear onto the intermediate shaft, and installing a third gear onto an axial section of the second gear. In this example, the third gear is larger than the first gear and the second gear. By fabricating the gear train in such a manner, the gears may be formed with a relatively high accuracy. The gear train may therefore be operated at a relatively high speed with a decreased amount of NVH, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-15 and 17-19 are drawn approximately to scale. However, other relative dimensions of the components may be used in other embodiments.

DETAILED DESCRIPTION

An electric drive axle system with a gear train is described herein. Different features of a gear train allow the gear train to achieve a compact design relative to previous electrified axles. One such feature of the gear train includes the arrangement of a larger gear between two smaller gears on an intermediate shaft of the drive train. The larger gear receives torque from an electric motor. The larger gear is coupled to a sleeve of one of the smaller gears extending between the larger gear and the intermediate shaft. Arranging the gears on the intermediate shaft in this manner enables the gears to be cut and ground with a relatively high accuracy while achieving a compact arrangement. Further, in one example, the smaller gears on the intermediate shaft may be rotationally coupled to a pair of gears on an output shaft. In this example, a park gear, indexing shaft, and shift collar assembly may be positioned axially between the pair of gears on the output shaft. In this way, the compactness of the gear train is further increased.

Figure 1:
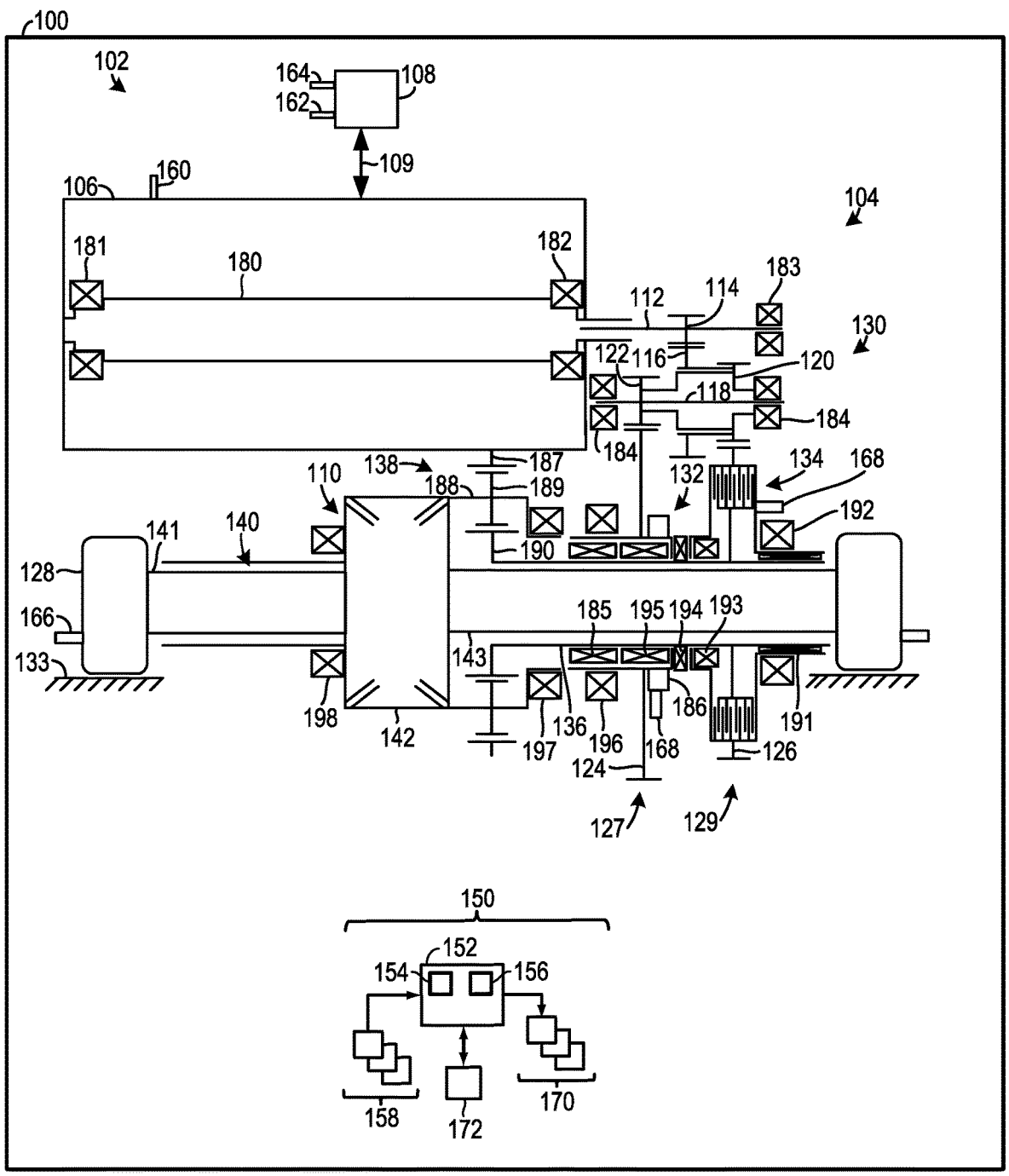
FIG. 1 is a schematic representation of a vehicle including an electric drive axle system.
Figure 2:
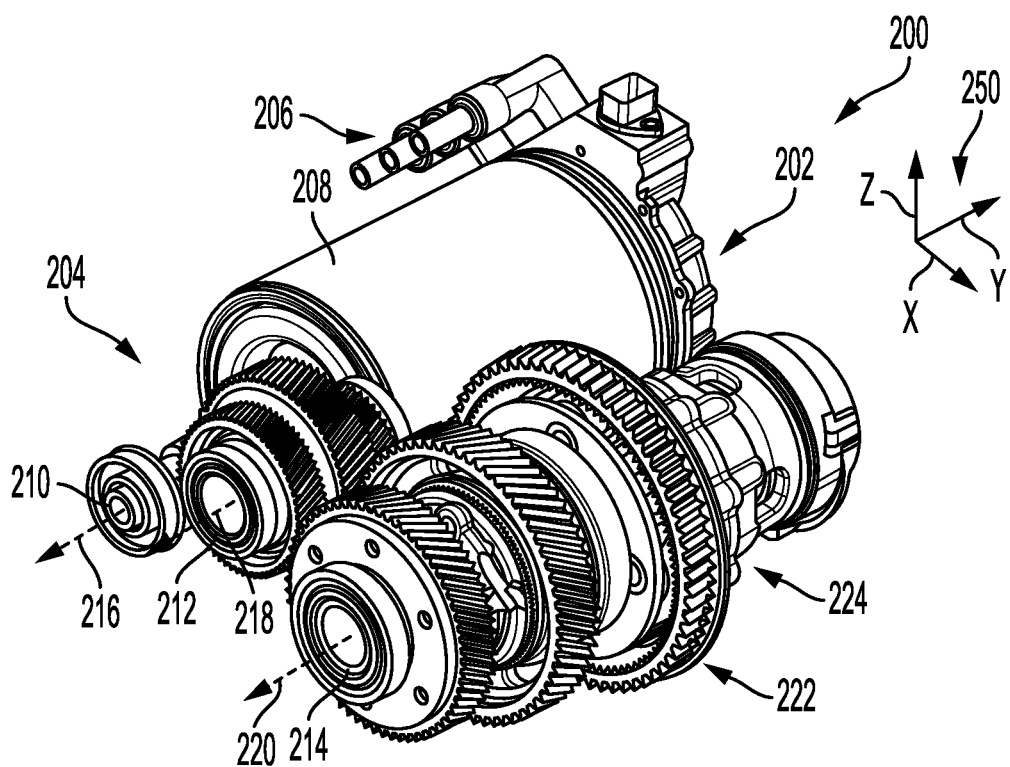
FIG. 2 shows a perspective view of an example of an electric drive axle system with a gear train having multiple selectable gear sets.
Figure 3:
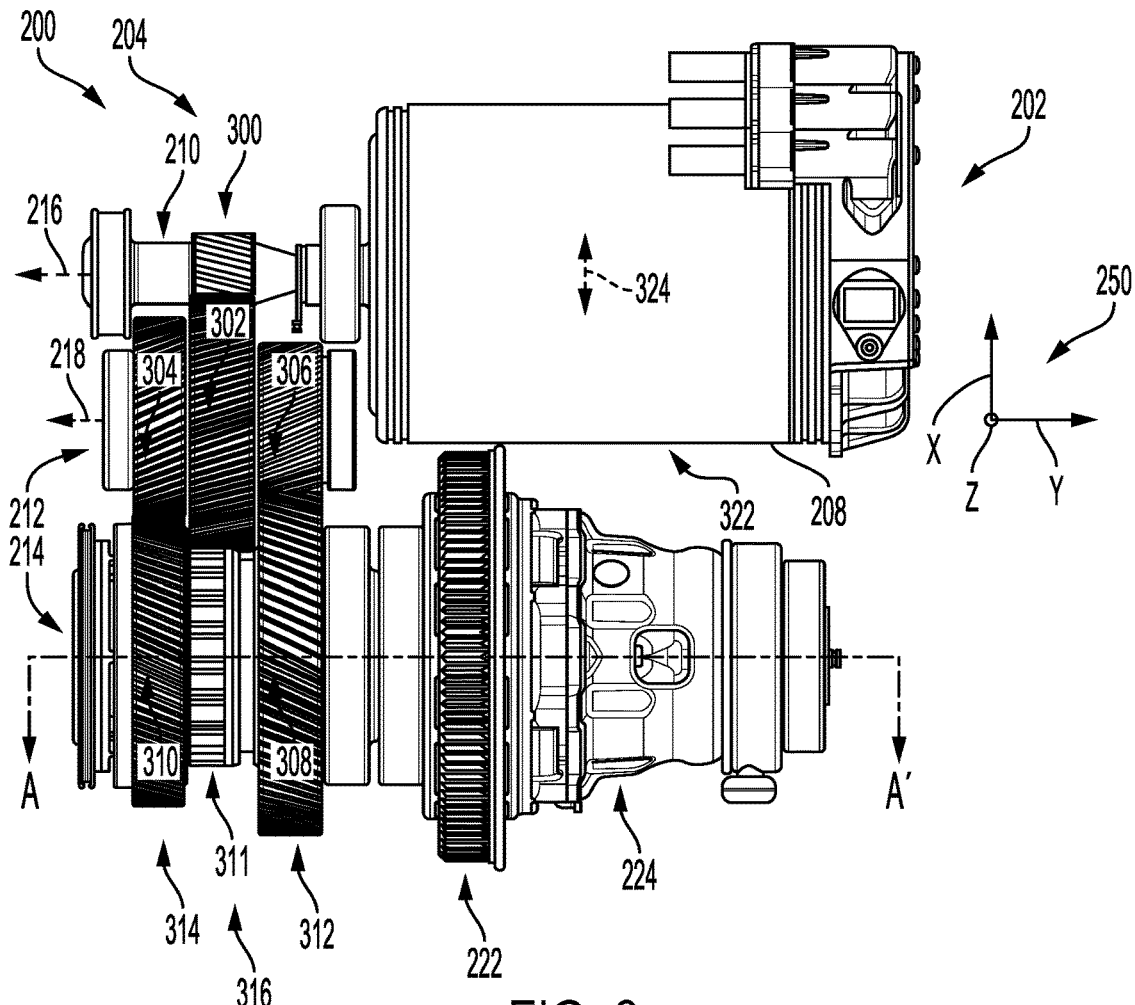
FIG. 3 shows a top view of the electric drive axle system, depicted in FIG. 2.
Figure 4:
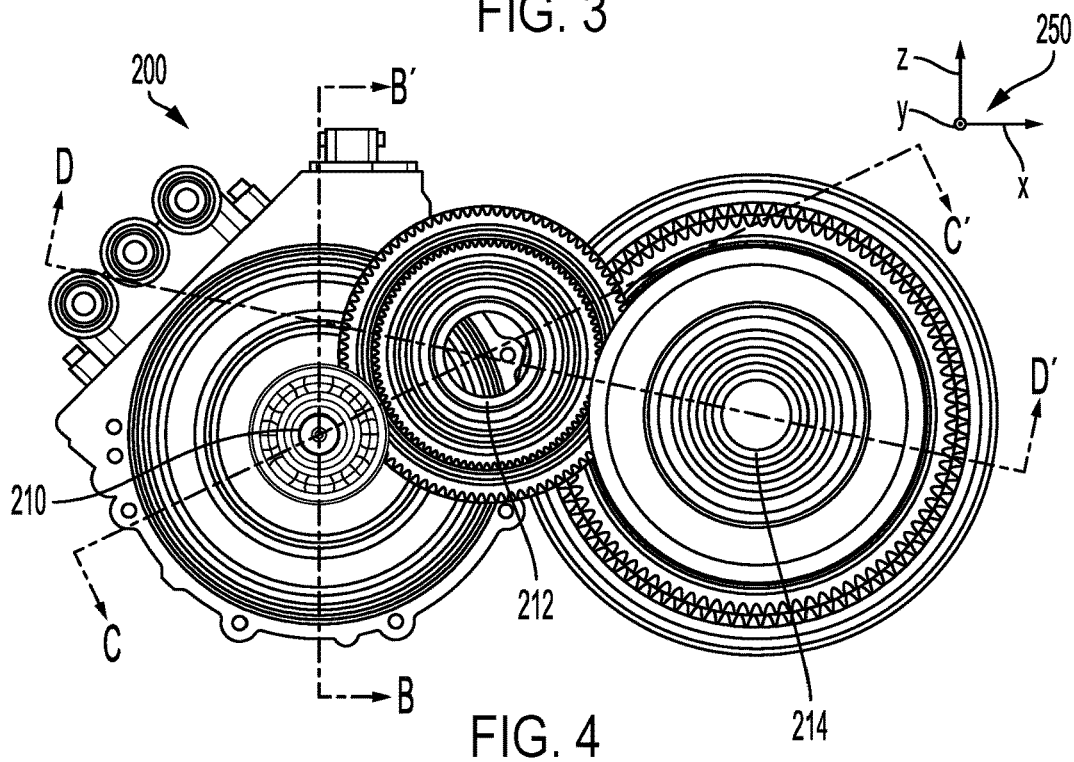
FIG. 4 shows a side view of the electric drive axle system, depicted in FIG. 2.
Figure 5:
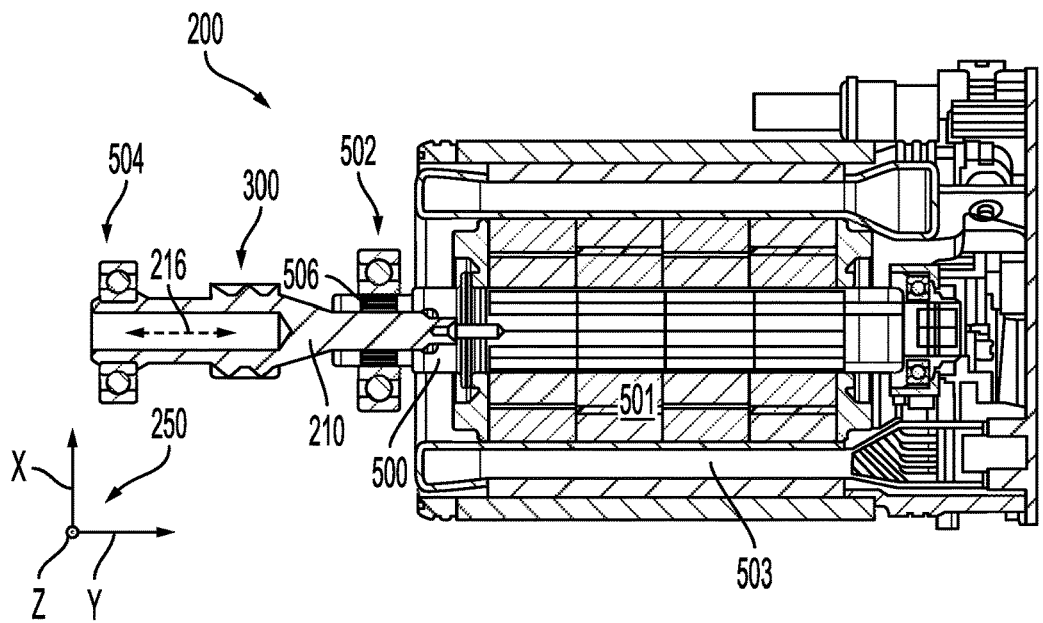
FIG. 5 shows a cross-sectional view of an electric motor-generator and input shaft in the electric drive axle system, depicted in FIG. 2.
Figure 6:
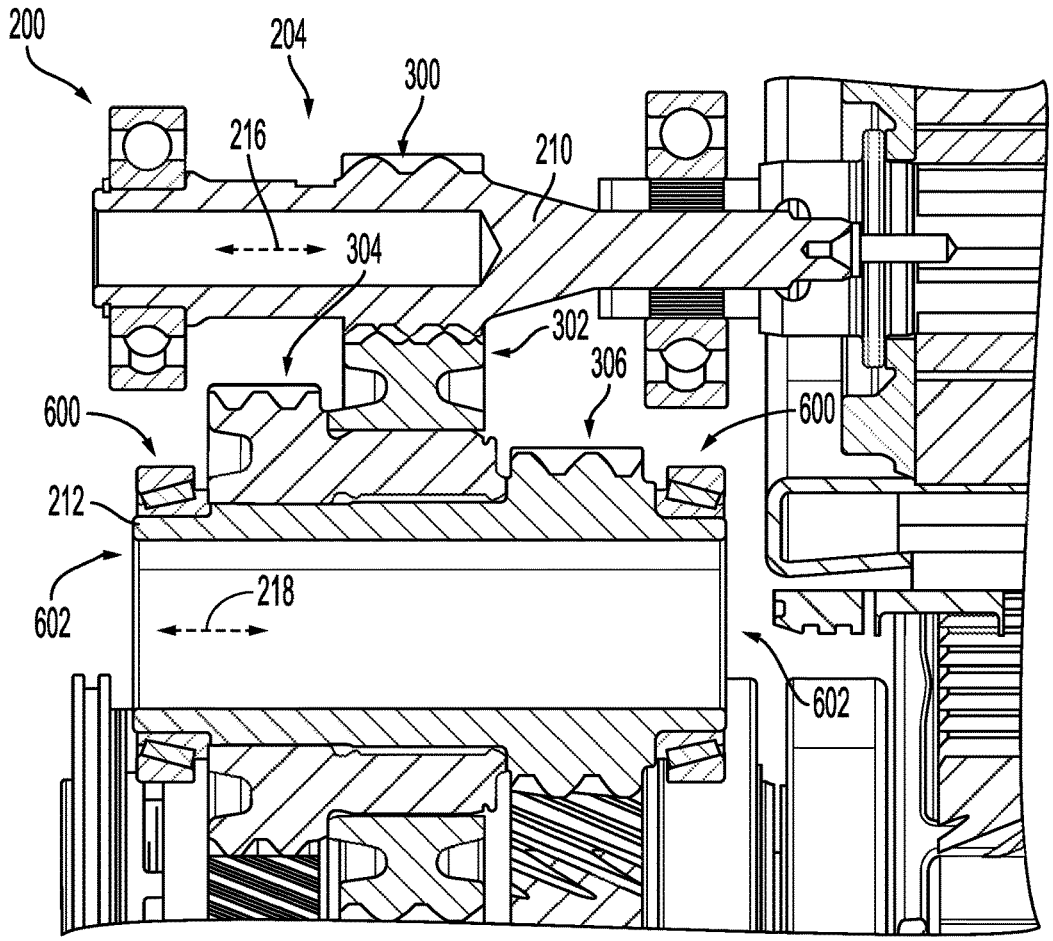
FIG. 6 shows a cross-sectional view of an intermediate shaft in the gear train of the electric drive axle system, depicted in FIG. 2.
Figure 7:
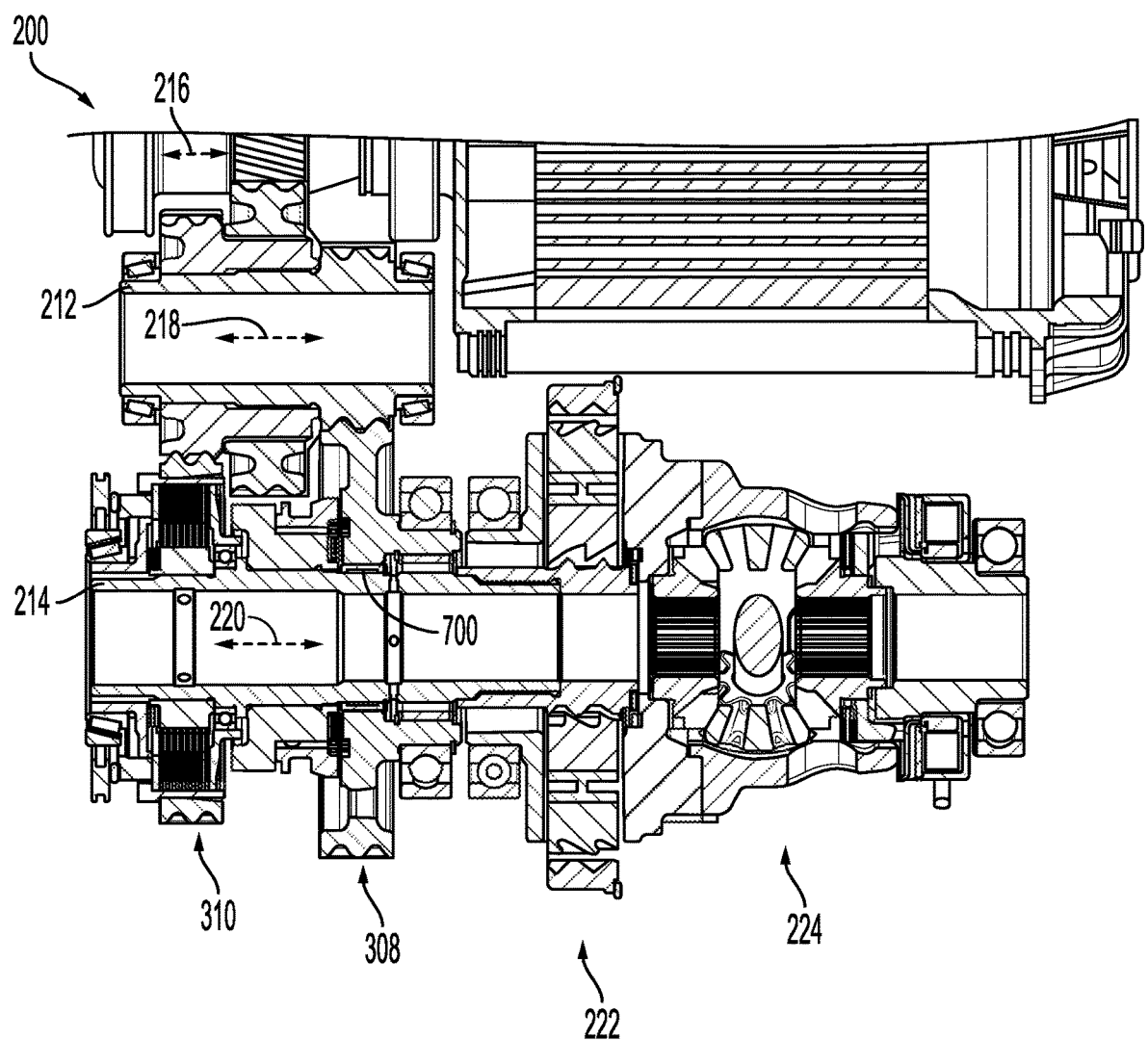
FIG. 7 shows a cross-sectional view of an output shaft, gear assembly, and differential in the gear train of the electric drive axle system, depicted in FIG. 2.
Figure 8:
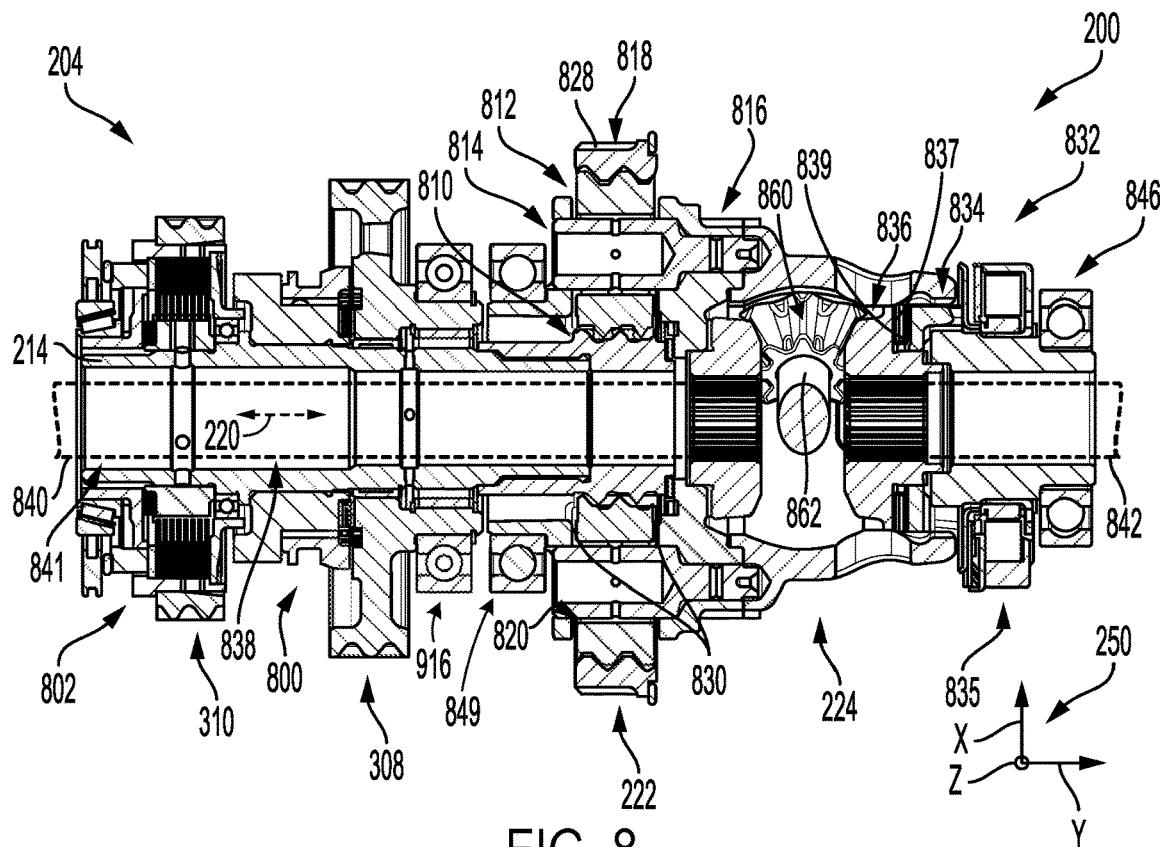
FIG. 8 shows a more detailed view of the output shaft, gear assembly, and differential in the gear train of the electric drive axle system, depicted in FIG. 2.
Figure 9:
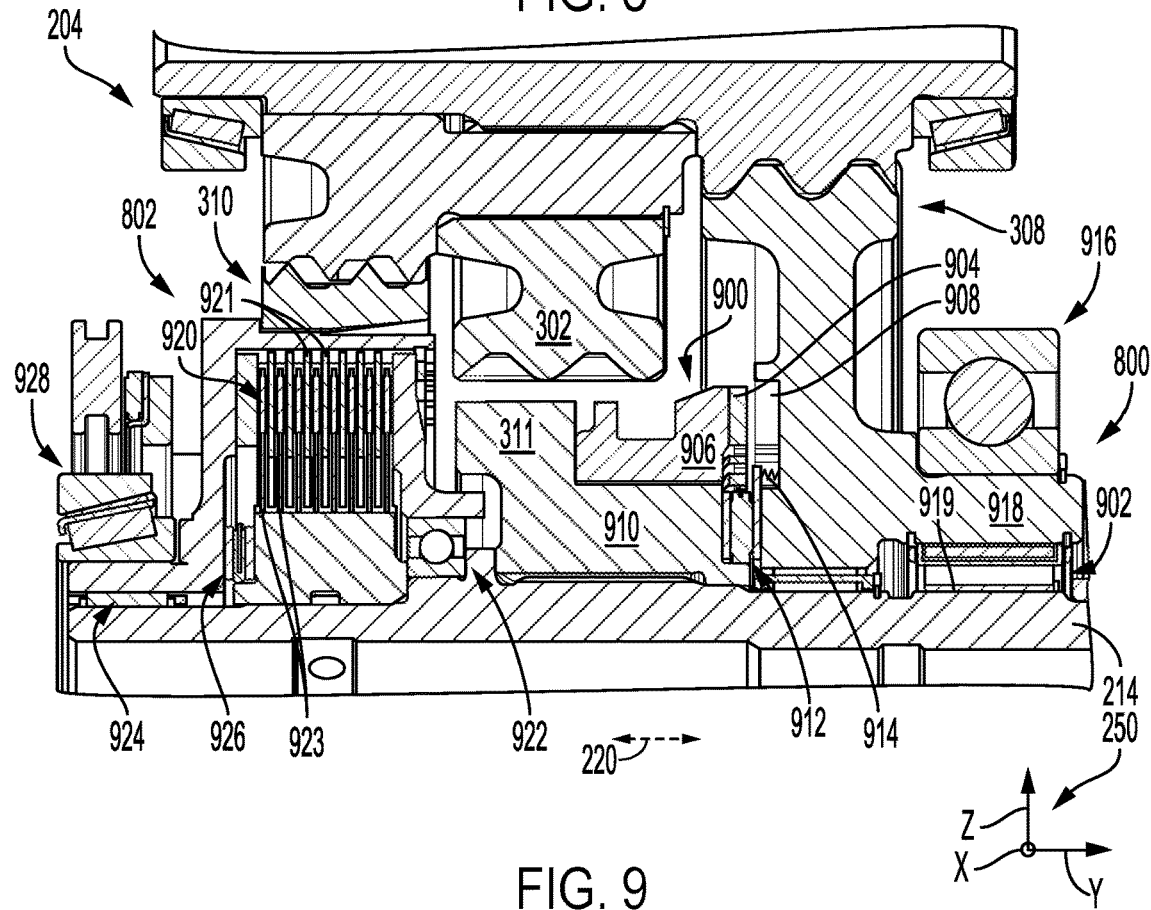
FIG. 9 shows a more detailed view of the clutch assemblies in the gear train of the electric drive axle system, depicted in FIG. 2.
Figure 14:
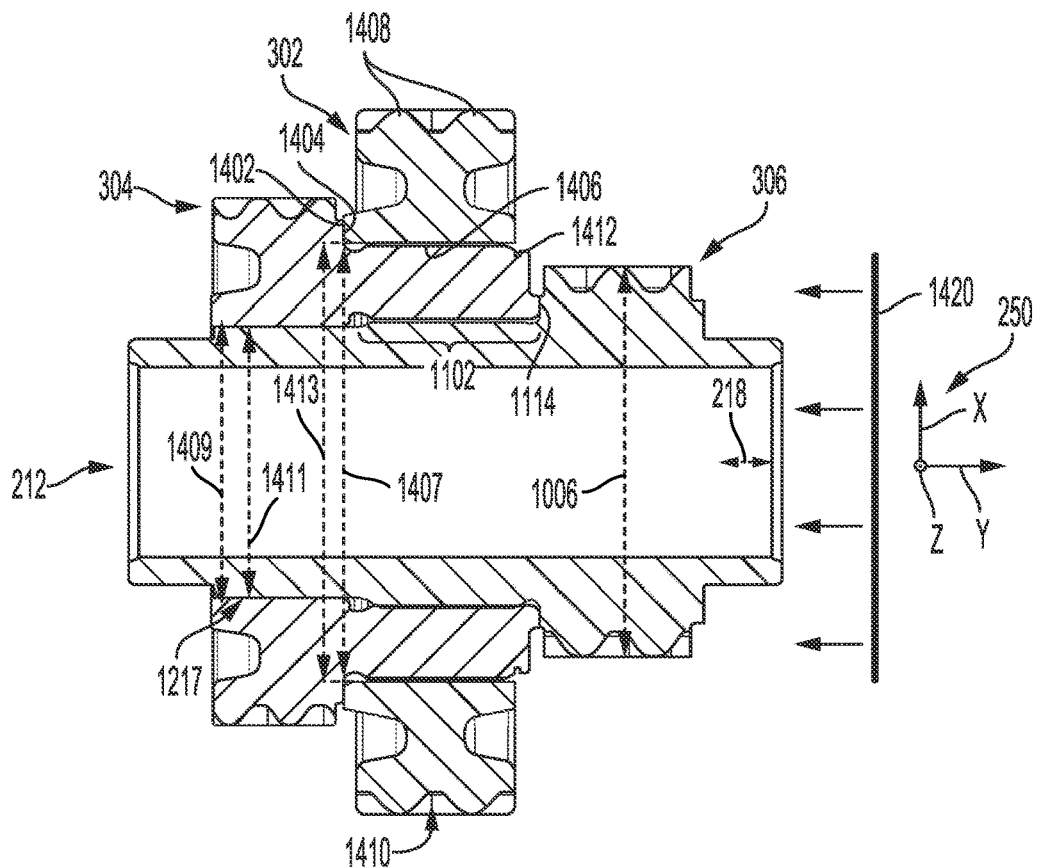
FIG. 14 shows a third manufacturing step of the intermediate shaft of FIG. 10, illustrating the incorporation of a second gear on the shaft.
Figure 15:
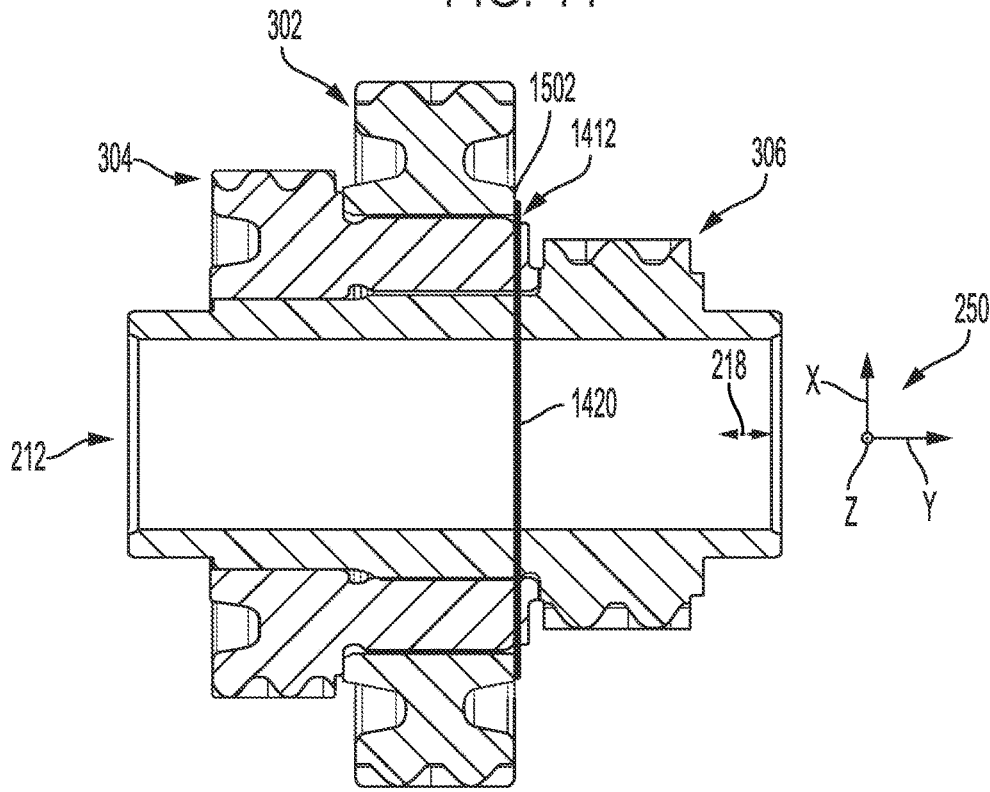
FIG. 15 shows a fourth manufacturing step of the intermediate shaft of FIG. 10, illustrating a securing of the second gear to the shaft.
Figure 16:
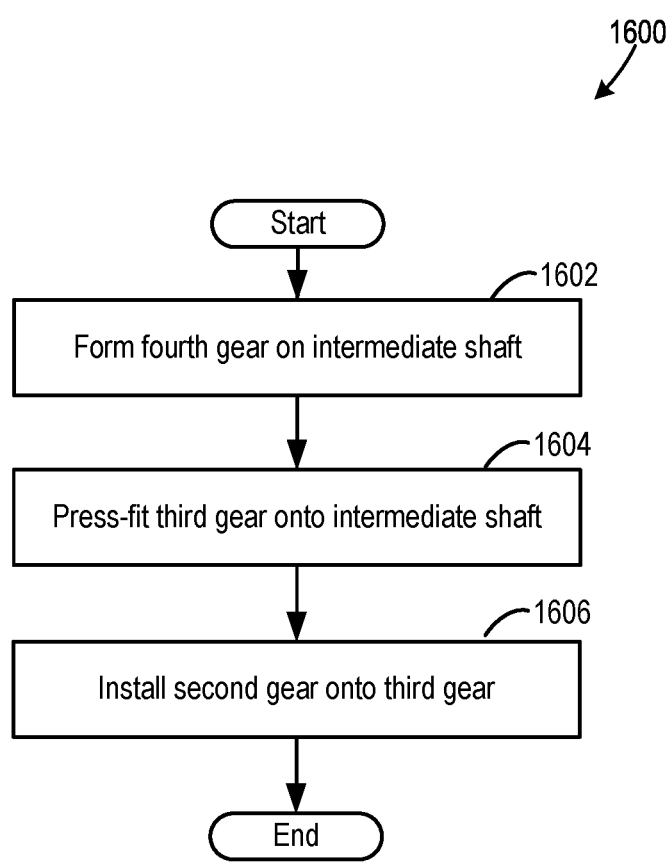
FIG. 16 shows a method for manufacturing of the intermediate shaft.
Figure 17:
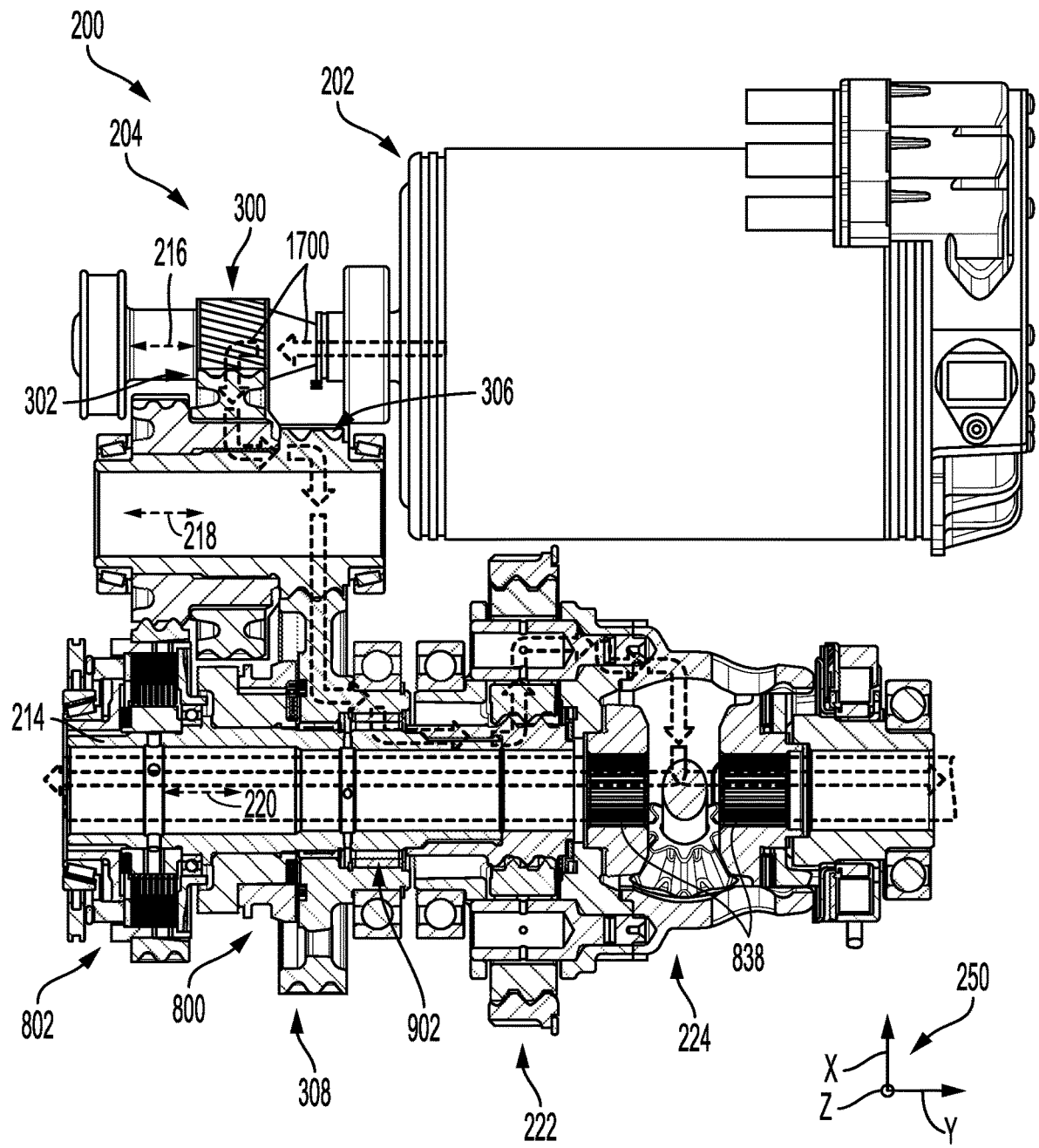
FIGS. 17-19 show power paths for different operating modalities of the electric drive axle system, depicted in FIG. 2.
Figure 18:
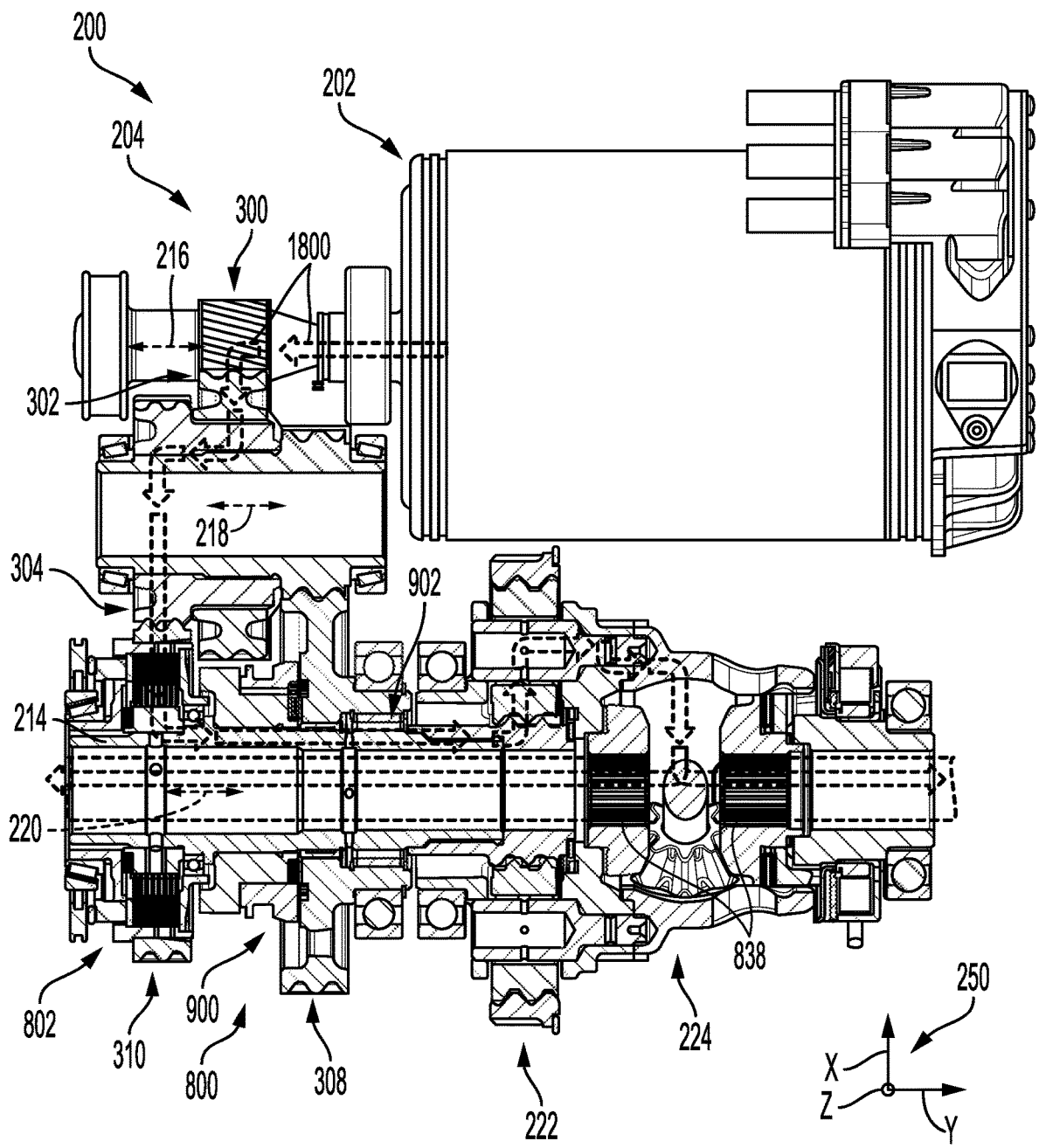
Figure 19:
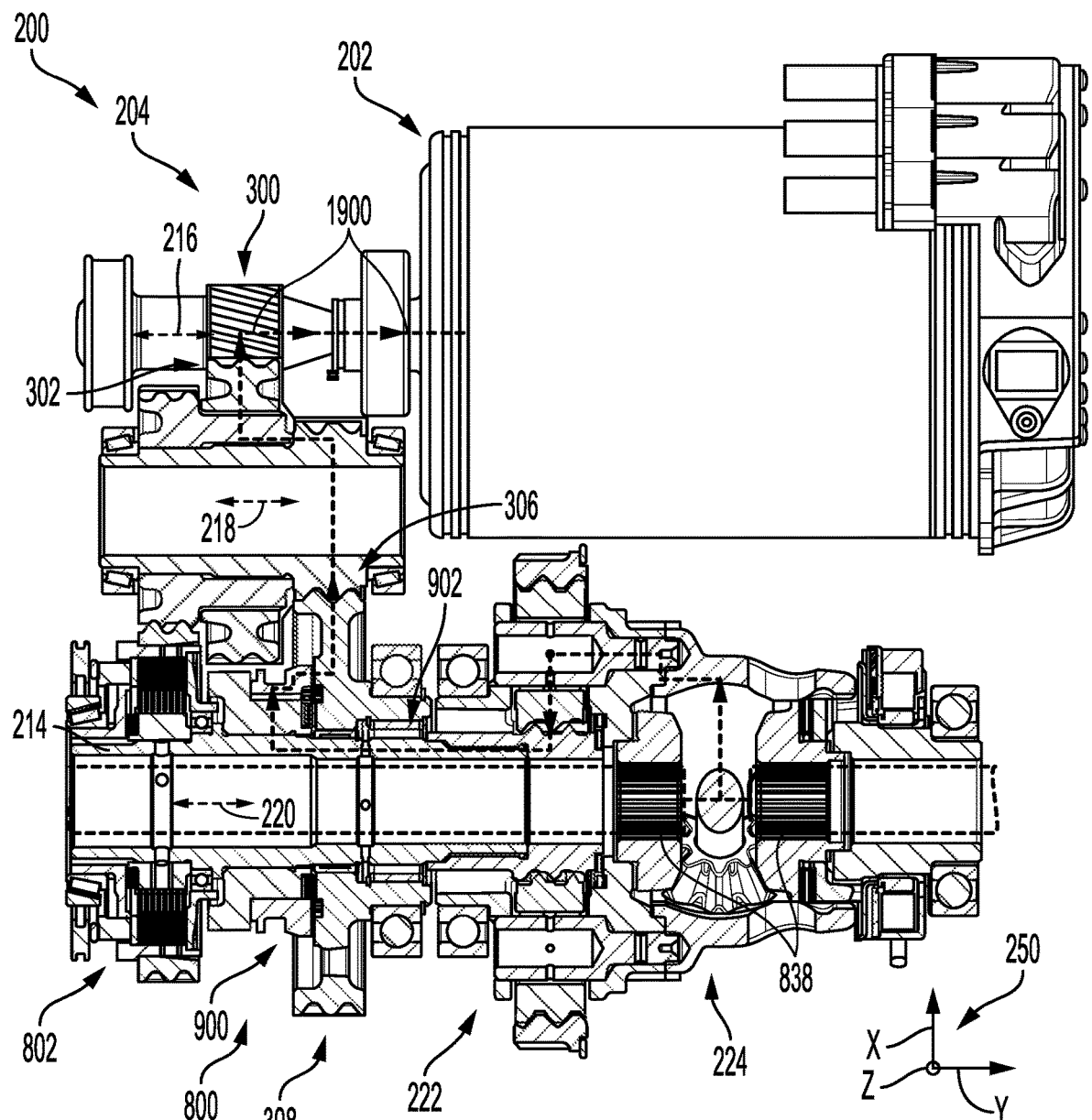

FIG. 1 schematically illustrates a vehicle with an electric drive axle system designed with multiple gear ratios. FIGS. 2-4 illustrate different views of an example of an electric drive axle system. FIG. 5 shows a cross-sectional view of an electric motor-generator included in the electric drive axle system, shown in FIG. 4. FIG. 6 shows a cross-sectional view of an input shaft and intermediate shaft included in a gear train in the electric drive axle system, shown in FIG. 4. FIG. 7 shows a cross-sectional view of an intermediate shaft and an output shaft in the gear train in the electric drive axle system, shown in FIG. 4. FIG. 8 shows a cross-sectional view of the output shaft included in the gear train in the electric drive axle system, shown in FIG. 4. FIG. 9 shows a detailed view of clutch assemblies in the electric drive axle system, shown in FIG. 4. FIGS. 10-15 sequentially depict a process for manufacturing the intermediate shaft. A manufacturing method for the intermediate shaft assembly is shown in FIG. 16. FIGS. 17-19 show exemplary gear train power paths occurring during different modes of system operation. Exemplary as expressed herein does not give any sort of preferential indication but rather denotes potential aspects of the system.

FIG. 1 shows a schematic depiction of a vehicle 100 having an electric drive axle system 102 with a gear train 104 and an electric motor-generator 106. The stick diagram of FIG. 1 provides a high-level topology of the vehicle, gear train, and corresponding components. However, it will be understood that the vehicle, gear train, and corresponding components have greater structural complexity than is captured in FIG. 1. The structural details of various facets of the gear train 104 are illustrated, by way of example, in greater detail herein with regard to FIGS. 2-15 and 17-19.

The electric motor-generator 106 is electrically coupled to an energy storage device 108 (e.g., battery, capacitor, and the like). Arrows 109 signify the energy transfer between the electric motor-generator 106 and the energy storage device 108 that may occur during different modes of system operation. The electric motor-generator 106 may include conventional components for generating rotational output (e.g., forward and reverse drive rotational output) and/or electrical energy for recharging the energy storage device 108 such as a rotor electromagnetically interacting with a stator, to provide the aforementioned energy transfer functionality.

The electric motor-generator 106 is shown including a rotor shaft 180 with a first bearing 181 and a second bearing 182 coupled thereto. The first bearing 181 may be a fixed bearing and the second bearing 182 may be a floating bearing. Although the second bearing 182 is shown positioned within the motor-generator, it will be understood that in some embodiments, bearing 182 may be coupled to the input shaft to facilitate rotation thereof. Other bearing arrangements with regard to the motor-generator have been contemplated such as arrangements with alternate quantities and/or types of bearings.

The vehicle may take a variety of forms in different embodiments. For example, the vehicle 100 may be a hybrid vehicle where both the electric motor-generator 106 and an internal combustion engine (not shown) are utilized for motive power generation. For instance, in one use-case hybrid vehicle configuration, the internal combustion engine may assist in recharging the energy storage device 108, during certain conditions. In another use-case hybrid vehicle configuration, the internal combustion engine may be configured to provide rotational energy to a differential 110 or other suitable locations in the gear train 104. In yet another use-case hybrid vehicle configuration, the engine may provide rotational input to another drive axle (not shown). Further, in other examples, the vehicle may be a battery electric vehicle (BEV) where the internal combustion engine is omitted.

The rotor shaft 180 of the electric motor-generator 106 is coupled to an input shaft 112. For instance, the rotor shaft 180 may be transition fit, slip fit, mechanically attached, in splined engagement, combinations thereof, etc., with an end of the input shaft 112. A first gear 114 is positioned or formed on the input shaft 112. A bearing 183 is shown coupled to the input shaft 112. The bearing 183 may be a fixed bearing, in one example. However, in other examples, the bearing 183 may be another suitable type of bearing or in some cases may be omitted from the system.

A second gear 116 is rotationally coupled to the first gear 114 and resides on an intermediate shaft 118. As described herein, rotational coupling between gears or other components may include an interface between the gears where teeth of the gears mesh to facilitate rotational energy transfer therebetween. As such, rotational coupling of the components allows for rotational energy transfer between the corresponding components. Conversely, rotational decoupling may include a state between two components when rotational energy is substantially inhibited from being transferred between the components.

A third gear 120 and a fourth gear 122 are additionally included on the intermediate shaft 118, although other gearing arrangements have been envisioned. Bearings 184 (e.g., tapered roller bearings) are coupled to either axial end of the intermediate shaft 118 to support the shaft and facilitate rotation thereof. The tapered roller bearings may decrease the axle package width when compared to other types of bearing such as ball bearings. However, other suitable intermediate shaft bearing types and/or arrangements have been envisioned. The bearing arrangement on the intermediate shaft as well as the other bearing arrangements described herein may be selected based on expected shaft loading (e.g., radial and thrust loading), gear size, shaft size, etc.

Continuing with the gear train description, the fourth gear 122 is rotationally coupled to a fifth gear 124 and the third gear 120 is rotationally coupled to a sixth gear 126. The first gear 114, the second gear 116, the third gear 120, the fourth gear 122, the fifth gear 124, and the sixth gear 126 are included in a gear assembly 130, in the illustrated embodiment. However, the gear assembly may include an alternate number of gears and/or have a different layout, in other embodiments. The number of gears in the assembly and the assembly layout may be selected based on end-use design goals related to desired gear range and packaging, for instance.

The first gear 114, the second gear 116, the fourth gear 122, and the fifth gear 124, may be included in a first gear set 127. Additionally, the first gear 114, the second gear 116, third gear 120, and the sixth gear 126, may be included in a second gear set 129. The first gear set 127 may have a higher gear ratio than the second gear set 129, in one example. However, other gear arrangements in the different gear sets may be used, in other examples. Clutch assemblies in the system 102 allow the first gear set 127 or the second gear set 129 to be placed in an operational state. To elaborate, the clutch assemblies allow the gear ratio delivered to drive wheels 128 on driving surfaces 133, by way of the gear assembly 130, a planetary gear assembly 138, and the differential 110, to be adjusted. For instance, the clutch assemblies may be operated to engage the first gear set 127, during certain conditions (e.g., towing, lower speed vehicle operation, etc.), and engage the second gear set 129, during other conditions (e.g., higher speed vehicle operation). As such, the system may transition between the different gear sets based on vehicle operating conditions, driver input, etc. In this way, the gear train has distinct selectable gear ratios, allowing the gear train to be adapted for different driving conditions, as desired. It will be appreciated that the gear ratio adjustability may also be utilized to increase electric motor efficiency, in some cases.

The system 102 may specifically include a first clutch assembly 132 and a second clutch assembly 134. The first clutch assembly 132 is configured to rotationally couple and decouple the fifth gear 124 from an output shaft 136. Likewise, the second clutch assembly 134 functions to rotationally couple and decouple the sixth gear 126 from the output shaft 136. The first clutch assembly 132 may include a one-way clutch 185 (e.g., sprag clutch) and a locking clutch 186 working in conjunction to accomplish the coupling/decoupling functionality, in a compact arrangement. However, other clutch designs have been contemplated, such as a friction clutch (e.g., wet friction clutch), a hydraulic clutch, an electromagnetic clutch, and the like. The structure and function of the one-way and locking clutches are described in greater detail herein. The second clutch assembly 134 may be a wet friction clutch providing smooth engagement/disengagement, in one embodiment. However, in other examples, the second clutch assembly 134 may include additional or alternate types of suitable clutches (e.g., hydraulic, electromagnetic, etc.).

The output shaft 136 is rotationally coupled to the planetary gear assembly 138, in the illustrated embodiment. The planetary gear assembly 138 may include an annulus 187 also referred to as a ring gear, a carrier 188 with planet gears 189 mounted thereon, and a sun gear 190 providing a space efficient design capable of providing a relatively high gear ratio in comparison to non-planetary arrangements. However, non-planetary gear layouts may be used in the system, in certain embodiments, when for example, space efficient packaging is less favored. In the illustrated embodiment, the sun gear 190 is rotationally coupled to the output shaft 136 and the carrier 188 is rotationally coupled to the differential 110 (e.g., a differential case). However, in alternate examples, different gears in the planetary assembly may be rotationally coupled to the output shaft and the differential.

Further, in one example, the components of the planetary gear assembly 138 may be non-adjustable with regard to the components that are held stationary and allowed to rotate. Thus, in one-use case example, the annulus 187 may be held substantially stationary and the carrier 188, planet gears 189, and the sun gear 190 and the gears stationary/rotational state may remain unchanged during gear train operation. In the illustrated embodiment, the annulus 187 is fixedly coupled to the motor-generator housing, to increase system space efficiency. However, the annulus may be fixedly coupled to other vehicle structures, in other instances. By using a non-adjustable planetary assembly, gear train operation may be simplified when compared to planetary arrangements with gears having rotational state adjustability. However, adjustable planetary arrangements may be used in the system, in other embodiments.

Various bearings may be coupled to the output shaft 136 and the planetary gear assembly 138 to enable rotation of components coupled to the shaft and assembly and in some cases support the components with regard to radial and/or thrust loads. A bearing 191 (e.g., needle roller bearing) is shown coupled to the output shaft 136 and the second clutch assembly 134. Additionally, a bearing 192 (e.g., tapered roller bearing) is shown coupled to the second clutch assembly 134. A bearing 193 (e.g., floating bearing) is also shown coupled to the second clutch assembly 134 and the output shaft 136. A bearing 194 (e.g., thrust bearing) may also be positioned axially between and coupled to the sixth gear 126 and the first clutch assembly 132. A bearing 196 (e.g., fixed bearing) may also be coupled to the one-way clutch 185. Additionally, a bearing 197 (e.g., ball bearing) is shown coupled to the planetary gear assembly 138 and a bearing 198 (e.g., ball bearing) is shown coupled to the differential case 142. However, other suitable bearing arrangements have been contemplated, such as arrangements where the quantity and/or configurations of the bearings are varied.

Additionally, FIG. 1 depicts the planetary gear assembly 138 directly rotationally coupled to the differential 110. Directly coupling the planetary gear assembly to the differential increases system compactness and simplifies system architecture. In other examples, however, intermediate gearing may be provided between the planetary gear assembly and the differential. In turn, the differential 110 is designed to rotationally drive an axle 140 coupled to the drive wheels 128. The axle 140 is shown including a first shaft section 141 and a second shaft section 143 coupled to different drive wheels 128. Furthermore, the axle 140 is shown arranged within (e.g., co-axial with) the output shaft 136 which allows more space efficient design to be achieved. However, offset axle-output shaft arrangements may be used, in other examples.

Further in one example, the axle 140 may be a beam axle. A beam axle, also referred to in the art as a solid axle or rigid axle, may be an axle with mechanical components structurally supporting one another and extending between drive wheels coupled to the axle. Thus, wheels coupled to the axle may move in unison when articulating, during, for example, vehicle travel on uneven road surfaces. For instance, the beam axle may be a structurally continuous axle spanning the drive wheels on a lateral axis, in one embodiment. In another embodiment, the beam axle may include co-axial axle sections receiving rotational input from different gears in the differential and structurally supported by the differential.

The differential 110 may include a case 142 housing gearing such as pinion gears, side gears, etc., to achieve the aforementioned energy transfer functionality. To elaborate, the differential 110 may be an electronic locking differential, in one example. In another example, the differential 110 may be an electronic limited slip differential or a torque vectoring dual clutch. In yet other examples, an open differential may be used. Referring to the locking differential example, when unlocked, the locking differential may allow the two drive wheels to spin at different speeds and conversely, when locked, the locking differential may force the drive wheels to rotate at the same speed. In this way, the gear train configuration can be adapted to increase traction, under certain driving conditions. In the case of the limited slip differential, the differential allows the deviation of the speed between shafts 144 coupled to the drive wheels 128 to be constrained. Consequently, traction under certain road conditions (e.g., low traction conditions such as icy conditions, wet conditions, muddy conditions, etc.) may be increased due to the wheel speed deviation constraint. Additionally, in the torque vectoring dual clutch example, the differential may allow for torque delivered to the drive wheels to be independently and more granularly adjusted to again increase traction during certain driving conditions. The torque vectoring dual clutch may therefore provide greater wheel speed/torque control but may, in some cases, be more complex than the locking or limited slip differentials.

The vehicle 100 may also include a control system 150 with a controller 152. The controller 152 includes a processor 154 and memory 156. The memory 156 may hold instructions stored therein that when executed by the processor cause the controller 152 to perform the various methods, control techniques, etc., described herein. The processor 154 may include a microprocessor unit and/or other types of circuits. The memory 156 may include known data storage mediums such as random access memory, read only memory, keep alive memory, combinations thereof, etc. Furthermore, it will also be understood that the memory 156 may include non-transitory memory.

The controller 152 may receive various signals from sensors 158 coupled various locations in the vehicle 100 and the electric drive axle system 102. The sensors may include a motor-generator speed sensor 160, an energy storage device temperature sensor 162, an energy storage device state of charge sensor 164, wheel speed sensors 166, clutch position sensors 168, etc. The controller 152 may also send control signals to various actuators 170 coupled at different locations in the vehicle 100 and the electric drive axle system 102. For instance, the controller 152 may send signals to the electric motor-generator 106 and the energy storage device 108 to adjust the rotational speed and/or direction (e.g., forward drive rotational direction and reverse drive rotational direction) of the motor-generator. The controller 152 may also send signals to the first clutch assembly 132 and the second clutch assembly 134 to adjust the operational gear ratio in the gear train 104. For instance, the first clutch assembly 132 may be disengaged and the second clutch assembly 134 may be engaged to place the second gear set 129 in an operational state (transferring rotational energy between the electric motor-generator 106 and the output shaft 136). The other controllable components in the vehicle and gear system may function in a similar manner with regard to command signals and actuator adjustment. For instance, the differential 110 may receive command signals from the controller 152.

The vehicle 100 may also include an input device 172 (e.g., a gear selector such as a gear stick, gear lever, etc., console instrument panel, touch interface, touch panel, keyboard, combinations thereof, etc.). The input device 172, responsive to driver input, may generate a mode request indicating a desired operating mode for the gear train. For instance, in a use-case example, the driver may shift a gear selector into a gear mode (e.g., first gear mode or second gear mode) to generate a gear set modal transition request at the controller. In response, the controller commands gear train components (e.g., the first clutch assembly 132 and the second clutch assembly 134) to initiate a transition into a first gear mode, where the first gear set 127 is operational, from a second gear mode, where the second gear set 129 is operational, or vice versa. Other modality transitions have also been contemplated such as a modal transition into a forward drive mode from a reverse drive mode or vice versa responsive to driver input received from the input device 172. However, in other examples more automated gear train mode transitions may be implemented. For instance, the controller may automatically place the gear train in the first gear mode or the second gear mode based on vehicle speed and/or load, for example. The controller 152 may also be configured to transition the electric drive axle system 102 into a regenerative mode. In the regenerative mode, energy is extracted from the gear train using the electric motor-generator 106 and transferred to the energy storage device 108. For instance, the electric motor-generator 106 may be placed in a generator mode where at least a portion of the rotational energy transferred from the drive wheels to the generator by way of the gear train is converted into electrical energy. A variety of different modal control strategies have been contemplated. The power paths unfolding during the different system modes are discussed in greater detail herein with regard to FIGS. 17-19.

FIG. 2 shows an electric drive axle system 200. It will be appreciated that the electric drive axle system 200, shown in FIG. 2, serves as an example of the electric drive axle system 102 shown in FIG. 1. As such, at least a portion of the functional and structural features of the electric drive axle system 102 shown in FIG. 1 may be embodied in the electric drive axle system 200 shown in FIG. 2 or vice versa, in certain examples.

The electric drive axle system 200 again includes an electric motor-generator 202 and a gear train 204. The electric motor-generator 202 has an electrical interface 206 which is illustrated as a bus bar in FIG. 2. However, other suitable electrical interfaces may be used, in other examples. The electric motor-generator 202 further includes a housing 208. The gear train 204 may include an input shaft 210, an intermediate shaft 212, and an output shaft 214. The input shaft 210 receives rotational input (forward or reverse drive rotation) from the electric motor-generator 202, while the system is operating in forward and reverse drive modes. Different gears in a gear train 204 are coupled to the different shafts, expanded upon in greater detail herein with regard to FIG. 3. Rotational axes 216, 218, and 220 of the input shaft 210, the intermediate shaft 212, and the output shaft 214, respectively, are provided for reference in FIG. 2 and FIGS. 3-15 and 17-19 when applicable. FIG. 2 additionally shows a planetary gear assembly 222 rotationally coupled to a differential 224 in the gear train 204. The power paths through the gear train 204 are discussed in greater detail herein. It will be appreciated that placing the planetary gear assembly 222 next to the differential 224 allows less torque to be carried through the gear train 204, enabling the drive train to have fewer and/or smaller components, if wanted.

The planetary gear assembly 222 can achieve a targeted gear ratio (e.g., a relatively high gear ratio, such as a ratio greater than 20:1, in one use-case) in a compact arrangement relative to non-planetary gear arrangements. Thus, the planetary gear assembly can achieve a desired gear ratio with less components (e.g., gears and shafts) than non-planetary gear assemblies, if desired. Furthermore, in embodiments where the planetary gear assembly exhibits a relatively high torque output, the planetary assembly can attain a more compact packaging due to the load sharing between the planet gears, if desired. Axis system 250 is illustrated in FIG. 2 as well as FIGS. 3-15 and 17-19, when appropriate, for reference. The z-axis may be a vertical axis, the x-axis may be a lateral axis, and/or the y-axis may be a longitudinal axis, in one example. However, the axes may have other orientations, in other examples.

FIG. 3 shows the electric drive axle system 200 with the electric motor-generator 202, input shaft 210, intermediate shaft 212, output shaft 214, and gear train 204. The gear train 204 may include a first gear 300 coupled to the input shaft 210. As described herein, the descriptor "coupled to" may indicate one component is structurally coupled to or formed with another component. For instance, the first gear 300 may be machined from a flange on the input shaft 210, in one example, or separately manufactured and subsequently mechanically attached (e.g., welded, bolted, press-fit, etc.) to the input shaft 210. Thus, the first gear 300 may be integrally formed with a body 309 of the input shaft 210, in one example.

A second gear 302 is coupled to the intermediate shaft 212. A third gear 304 and a fourth gear 306 are also coupled to the intermediate shaft 212. Additionally, a fifth gear 308 and a sixth gear 310 are coupled to the output shaft 214. It will be understood, that during different modes of system operation different sets of gears may be operational. To elaborate, the first gear 300, the second gear 302, the fourth gear 306, and the fifth gear 308 may be included in a first gear set 312. On the other hand, the first gear 300, the second gear 302, the third gear 304, and the sixth gear 310 may be included in a second gear set 314. A park gear 311 may also be included in the gear train 204, in some examples. However, the gear sets may include different gear combinations, in other examples. It will be understood that the first and the second gear sets 312 and 314 have different gear ratios (e.g., the first gear set may have a higher gear ratio than the second). In this way, the gear train may include multiple gear ratios to increase gear train adaptability. Additionally, the gear sets share a few common gears (i.e., the first and second gears in the illustrated embodiment). Fixing the first ratio (i.e., the first and second gears) in the gear train can allow the accuracy of the gears to be increased, if wanted, thereby reducing noise, vibration, and harshness (NVH) in the axle system. However, embodiments where the gear sets do not include overlapping gears have been envisioned. Clutches, described in greater detail herein, are included in the gear train 204 to enable the first gear set 312 and the second gear set 314 to be coupled/decoupled to/from the output shaft 214. In this way, the different gear sets may be operationally selected to, for example, more aptly suit the driving environment and/or increase electric motor efficiency. Thus, the first and second gear sets 312 and 314 may be conceptually included in a selectable gear assembly 316. A cutting plane A-A' indicating the cross-sectional view of FIG. 8 is provided in FIG. 3.

The planetary gear assembly 222 is shown in FIG. 3 rotationally coupled to the output shaft 214. FIG. 3 additionally illustrates the differential 224 in the gear train 204 rotationally coupled to the planetary gear assembly 222. However, other gear layouts may be used in other examples, such as non-planetary gear assemblies, gear trains with gears positioned between the planetary assembly and the differential, etc. It will be appreciated that in some embodiments, the gear ratio corresponding to the planetary gear assembly 222 may be greater than the gear ratio corresponding to the first gear set 312 or the second gear set 314. The planetary gear assembly 222 allows a desired gear ratio to be realized in a compact arrangement. For instance, the planetary gear assembly 222 may achieve a relatively high gear ratio and space efficiency, if desired. However, non-planetary gear arrangements may be used, in other examples. Furthermore, the planetary gear assembly 222 and the differential 224 are shown positioned on a lateral side 322 of a housing 208 the electric motor-generator 202. A lateral axis 324 of the motor-generator is provided for reference. Offsetting the output shaft 214 and the intermediate shaft 212 from the input shaft 210 allows the planetary gear assembly 222 to be positioned on the side 322 of the motor-generator. It will be appreciated that the planetary gear assembly may be located adjacent to the motor's lateral side 322 due to the planetary gear assembly's ability to be integrated into the gear train without a mating gear parallel thereto, if wanted. In this way, the planetary gear assembly may be placed in a space which has remained unused in certain electrified gearboxes. Thus, positioning the planetary gear assembly on the side of the motor allows the compactness of the axle system to be increased. As a result, the packaging constraints arising during axle installation in the vehicle may pose less of an issue. However, in other examples, the planetary gear assembly 222 may be positioned in other suitable locations. For instance, the planetary gear assembly may be coupled to a section of the output shaft extending away from the motor-generator.

FIG. 4 shows a side view of the electric drive axle system 200 with the input shaft 210, intermediate shaft 212, and the output shaft 214. A cutting plane B-B' indicating the cross-sectional view of FIG. 5, a cutting plane C-C' indicating the cross-sectional view of FIG. 6, and a cutting plane D-D' indicating the cross-sectional view of FIG. 7, are illustrated in FIG. 4.

FIG. 5 shows a cross-section view of the electric motor-generator 202 and input shaft 210 in the electric drive axle system 200. The input shaft 210 is shown transition fit with a rotor shaft 500. However, other suitable coupling techniques have been contemplated, such as press fitting, welding, splined engagement, etc. The rotor shaft 500 is coupled to a rotor 501 designed to electromagnetically interact with a stator 503 to generate forward drive rotational output, reverse drive rotational output, and/or generate electrical energy during a regeneration mode.

A first bearing 502 and a second bearing 504 are shown coupled to the input shaft 210 with the first gear 300 thereon. The second bearing 504 may be positioned on an outboard axial side of the first gear 300 to, for example, reduce shaft bending moments. However, other bearing arrangements have been envisioned, such as a bearing arrangement with two bearings on an inboard side of the first gear 300. As described herein, a bearing is a component designed to enable rotation of the component(s) to which it is attached and therefore may include rolling elements (balls, cylindrical rollers, tapered cylindrical rollers, etc.), races (e.g., inner and outer races), etc., to enable the rotational functionality to be achieved. In one specific example, the first bearing 502 may be a floating bearing and/or may be coupled to the input shaft 210 via a slip fit spline 506. In another specific example, the second bearing 504 may be a fixed bearing. However, other suitable bearing configurations may be used, in other examples, such an arrangement where both of the bearings are fixed bearings, for instance.

Turning to FIG. 6, the input shaft 210 and the first gear 300 are shown rotationally attached to the second gear 302 in the intermediate shaft 212 of the gear train 204 of the electric drive axle system 200. Therefore, during gear train operation, torque is transferred between the first gear 300 and the second gear 302. The third gear 304 and the fourth gear 306 attached to the intermediate shaft 212 are also depicted in FIG. 6. However, other gearing arrangements may be used, in other examples. Bearings 600 are shown positioned on opposing axial sides 602 of the intermediate shaft 212. The bearings 600 are specifically illustrated as tapered roller bearings. However, other types of bearings and/or bearing arrangements may be used for the intermediate shaft, in other examples.

FIG. 7 shows a detailed cross-sectional view of the intermediate shaft 212 and the output shaft 214 included in the electric drive axle system 200. The sixth gear 310 is shown coupled to the output shaft 214. The fifth gear 308 is arranged on a bearing 700 coupled to the output shaft 214. The planetary gear assembly 222 and the differential 224 are also shown in FIG. 7. The differential 224 is depicted as a bevel gear differential, in FIG. 7. However, planetary gear, spur, or helical gear differentials may be used, in other embodiments.

Referring to FIG. 8, a more detailed view of the output shaft 214 and corresponding components in gear train 204 of the electric drive axle system 200 are shown. Specifically, the fifth gear 308, the sixth gear 310, the planetary gear assembly 222, and the differential 224 are again depicted. The electric drive axle system 200 includes clutches allowing the gear ratio in the gear train 204 delivered to the planetary gear assembly 222 to be adjusted. Specifically, a first clutch assembly 800 is configured to rotationally couple and decouple the fifth gear 308 from the output shaft 214 and a second clutch assembly 802 is configured to rotationally couple and decouple the sixth gear 310 from the output shaft.

FIG. 9 shows a detailed view of the first clutch assembly 800 configured to rotationally couple/decouple the fifth gear 308 from the output shaft 214. To elaborate, the first clutch assembly 800 includes a locking clutch 900 and a one-way clutch 902, in the illustrated example. The one-way clutch 902 is designed to freely rotate about the output shaft 214 when receiving rotational input in a first direction (reverse drive rotational direction) or when it is overrun via the output shaft and is configured to transfer torque to the output shaft 214 when receiving rotational input in a second direction (e.g., front drive rotational direction). The one-way clutch 902 may be a sprag clutch, in one example. However, other suitable types of one-way clutches may be used in other examples, such as ratcheting clutches.

The locking clutch 900 is designed to rotationally couple and decouple the fifth gear 308 from the output shaft 214. To elaborate, the locking clutch 900 may be a dog clutch with teeth 904 on an axially adjustable shift collar 906 designed to mate with teeth 908 in the fifth gear 308 when engaged. Conversely, when the dog clutch is disengaged the teeth 904 on the shift collar 906 may be spaced away from the teeth 908 on the fifth gear 308. The shift collar 906 may be rotationally attached to the output shaft 214 by way of an indexing shaft 910. Furthermore, the indexing shaft 910 may be attached to the output shaft via press-fitting, a splined interface, combinations thereof, etc. However, the first clutch assembly 800 may take other forms, in alternate embodiments. For instance, the first clutch assembly may be a friction clutch, in an alternate example.

A thrust bearing 912 (e.g., needle roller thrust bearing) is also shown positioned at an interface between the indexing shaft 910 and the fifth gear 308 to enable a desired spacing to be maintained between the components while allowing rotation therebetween. Additionally, the thrust bearing 912 may be preloaded via a spring 914 (e.g., a wave spring, helical spring, elastomeric spring, etc.). However, other suitable gear train arrangements may be used in other examples such as gear trains where the spring 914 and/or thrust bearing 912 are omitted. A bearing 916 (e.g., a fixed bearing) is also shown attached to an extension 918 (e.g., axial extension) of the fifth gear 308 interfacing with the one-way clutch 902. However, in other examples the bearing 916 may be omitted from the gear train. The bearing 916 is specifically depicted as a ball bearing. The ball bearing may be used in the system, due to cost and packaging. However, the bearing 916 may be a spherical roller bearing, a tapered roller bearing, etc., in other embodiments. The one-way clutch 902 is also shown positioned between the extension 918 of the fifth gear 308 and an outer surface 919 of the output shaft 214.

The second clutch assembly 802 is depicted in FIG. 9 as a friction clutch (e.g., wet friction clutch). Using a friction clutch enables load transfer in both forward and reverse directions, enabling the second clutch assembly to forego a locking clutch, in some instances. However, alternate types of clutches such as hydraulic clutches, electromagnetic clutches, and the like may be deployed, in other arrangements. The friction clutch includes friction plates 920 engaging one another during clutch engagement to transfer rotational energy from the sixth gear 310 to the output shaft 214. Likewise, when the friction clutch is disengaged, the friction plates 920 are frictionally decoupled and rotational energy transfer from the sixth gear 310 to the output shaft 214 is inhibited. To elaborate, a first set of friction plates 921 are coupled to the sixth gear 310 and a second set of friction plates 923 are coupled to the output shaft 214 to enable coupling/decoupling action in the clutch.

Various bearings may enable the friction clutch to rotate as well as provide axial and radial support to the clutch. The bearing corresponding to the friction clutch may include for example, a floating bearing 922, a roller bearing 924 (e.g., needle tapered roller bearing), a thrust bearing 926 (e.g., needle roller thrust bearing), and a roller bearing 928. However, other suitable bearing arrangements providing a desired amount of radial and axial support to the friction clutch and output shaft for the friction clutch have been contemplated.

The friction clutch in the second clutch assembly 802 and the locking clutch 900 may be adjusted via commands from a controller, such as the controller 152 shown in FIG. 1, to induce engagement or disengagement of each clutch. As such, the gear train's gear ratio may be adjusted as desired based on vehicle operating conditions, driver input, etc.

Referring again to FIG. 8, showing the planetary gear assembly 222 rotationally coupled to the output shaft 214. FIG. 8 also illustrates the planetary gear assembly 222 with a sun gear 810 rotationally coupled to output shaft 214. The sun gear 810 is rotationally coupled to planet gears 812 residing on planet pins 814 on a carrier 816. In turn, the carrier 816 is shown coupled to the differential 224. However, planetary arrangements with other components (e.g., carrier or annulus) coupled to the output shaft 214 and other components (e.g., sun gear or annulus) coupled to the differential 224, have been envisioned. The planetary gear assembly 222 also includes an annulus 818 rotationally interacting with the planet gears 812. Bearings 820 (e.g., needle roller bearings) arranged between the planet pins 814 and the planet gears 812 may allow the planet gears to rotate. A thrust bearing 822 (e.g., needle roller thrust bearing) may also be coupled to the sun gear 810 to enable rotation thereof and provide axial support thereto.

The annulus 818 may be held fixed to enable the planetary gear assembly 222 to achieve a relatively high gear ratio. Thus, the annulus 818 may include structural features such as a spline 828 to enable the position of the annulus to be fixed. However, planetary gear arrangements where alternate components are held fixed and alternate components are allowed to rotate, may be utilized, in other examples. For instance, the annulus may be allowed to freely rotate and the carrier may be held stationary, in one example, or the sun gear may be held stationary and the carrier and the annulus may be allowed to rotate, in other examples. In one embodiment, the components in the planetary gear assembly that are allowed to rotate and held substantially stationary may not be adjustable, during gear train operation. The planetary gear assembly can therefore achieve even greater space efficiency, in such an embodiment. In other embodiments, planetary components whose fixed/rotational state can be adjusted during gear train operation have also been contemplated. Thrust washers and/or bushings 830 may also be positioned on opposing axial sides of the planet gears 812 to provide planet gear spacing and support functionality. A clutch assembly 832 configured to lock and unlock the differential 224 may also be included in the gear train 204. The clutch assembly 832 may, in one example, include a dog clutch 834 configured to operate in a locked and unlocked configuration. In the locked configuration the dog clutch 834 causes the side gears 836 to rotate in unison. Conversely, in the unlocked configuration, the dog clutch 834 allows the side gears 836 to have rotational speed variance. One of the gears 836 may therefore include teeth 837 mating/disengaging with/from teeth 839 in the dog clutch 834. The clutch assembly 832 may further include an electronic actuator 835 (e.g., solenoid) inducing engagement and disengagement of the clutch assembly 832. However, pneumatic or hydraulic clutch actuation may be utilized, in other embodiments.

FIG. 8 also shows the differential 224 rotationally coupled to an axle 838. Specifically, the side gears 836 may be rotationally attached to axle 838. The axle 838 is shown including a first shaft section 840 which may be coupled to a first drive wheel and a second shaft section 842 which may be coupled to a second drive wheel. However, in other examples, a continuous shaft may extend through the differential or the shaft may be partitioned into additional sections. The axle 838 may be a beam axle, enabling the load carrying capacity and the durability of the axle to be increased, if wanted. However, non-rigid axle designs may be utilized, in other cases. Additionally, the axle 838 is positioned within an interior opening 841 of the output shaft 214 and is positioned co-axial therewith, to increase system compactness. However, off-axis axle-output shaft layouts may be used, in some instances. A bearing 846 is also shown coupled to a case 848 of the differential 224. Additionally, a bearing 849 is shown coupled to the planetary gear assembly 222 (e.g., the carrier 816). However, the bearing 849 may be omitted or placed in another suitable location, in other embodiments.

The case 848 is rotationally coupled to the carrier 816. In turn, the case 848 is rotationally coupled to internal differential gearings. FIG. 8 specifically shows the differential 224 embodied as a locking type differential (e.g., electronic locking differential). However, as previously discussed, alternate types of differentials have been contemplated such as limited slip differentials (e.g., electronic limited slip differentials), differentials with a torque vectoring dual clutch, open differentials, etc. In the case of an open differential, the differential may share a common case with the planetary gear assembly and the case may be sized and profiled to enable differential gear installation. Furthermore, the differential 224 depicted in FIG. 8 includes bevel gears 860 attached via a bevel gear shaft 862. Additionally, in the illustrated embodiment, the bevel gears 860 are rotationally coupled to the side gears 836. However, planetary, spur, and helical gear type differentials may be used, in other examples.

The gear train 204 of the electric drive axle system 200 may provide an assembly with a compact packaging to reduce the footprint of the electric drive axle system 200. However, positioning the gears in the compact arrangement (e.g., positioning of the park gear 311 under the second gear 302, as shown in FIG. 9) may pose manufacturing challenges. For instance, precise gear grinding enabling such a configuration may be challenging using conventional manufacturing practices. Furthermore, grinding of the gears may occur in an order from a smallest gear to a largest gear to circumvent cutting into the largest gear, which may further complicate manufacturing of the gear train 204.

Highly accurate and compactly arranged gears may be achieved through the manufacturing process described below with reference to FIGS. 10-16. The electric drive axle system 200 of FIGS. 2-9 is also depicted in FIGS. 10-15 and similarly numbered.

Figure 10:
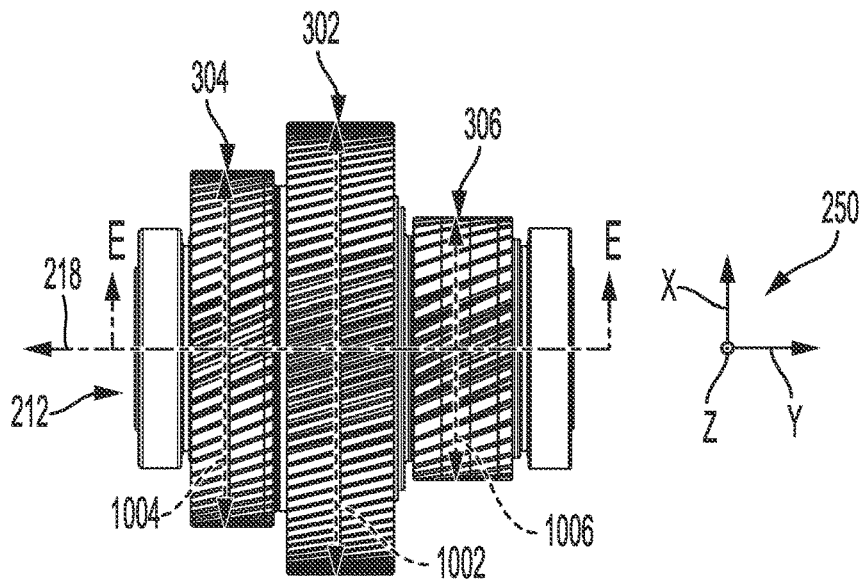
FIG. 10 shows an intermediate shaft of an electric drive axle system, including gears coupled to the intermediate shaft.

The intermediate shaft 212 is shown in FIG. 10 coupled to the second gear 302, the third gear 304, and the fourth gear 306. The second gear 302 is positioned between the third gear 304 and the fourth gear 306 and may have an outer diameter 1002 that is larger than an outer diameter 1004 of the third gear 304 or an outer diameter 1006 of the fourth gear 306. Additionally, the outer diameter 1004 of the third gear 304 may be larger than the outer diameter 1006 of the fourth gear 306. A cutting plane E-E' indicating a cross-sectional view of FIGS. 11-15 is provided in FIG. 10.

Figure 11:
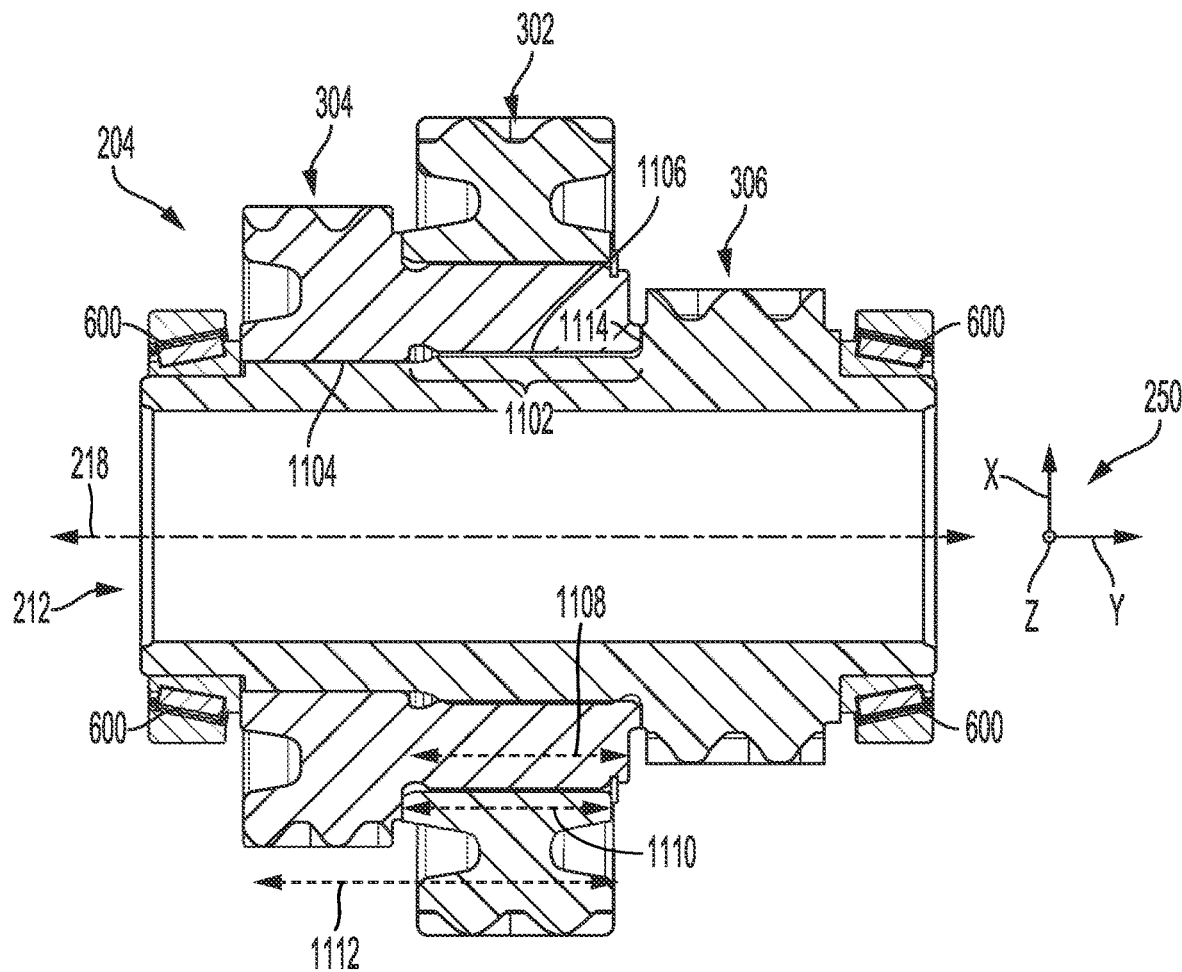
FIG. 11 shows a cross-sectional view of the intermediate shaft of FIG. 10.

The cross-sectional view of FIG. 11 shows that the second gear 302 is in contact with an axial section or extension 1102 of the third gear 304. The axial extension 1102 of the third gear 304 extends along the y-axis across an outer surface 1104 of the intermediate shaft 212, in contact with the intermediate shaft 212 (e.g., an inner surface 1106 of the third gear 304 is in face-sharing contact with the outer surface 1104 of the intermediate shaft 212). In the illustrated embodiment, a width 1108 of the axial extension 1102 of the third gear 304 is similar to a width 1110 of the second gear 302, the widths defined along the y-axis. Thus an overall width 1112 of the third gear 304 is greater than the width 1110 of the second gear 302. However, in other examples, the width 1108 of the axial extension 1102 may be greater than or equal to the width 1110 of the second gear 302.

A terminal edge 1114 of the third gear 304 at the axial extension 1102 may be adjacent to (e.g., in face sharing contact with) the fourth gear 306. The fourth gear 306 may be continuous with the intermediate shaft 212. In other words, the fourth gear 306 may be integrated into the outer surface 1104 of the intermediate shaft 212 so that the intermediate shaft 212 and the fourth gear 306 form a single unit (e.g., monolithic structure) without any seams or joints separating the fourth gear 306 from the intermediate shaft 212. As such, the fourth gear 306 may protrude outwards, along the x-axis, away from the rotational axis 218 of the intermediate shaft 212. However, in other embodiments, the fourth gear and the intermediate shaft may be separately manufactured and the fourth gear may be coupled to the intermediate shaft via press-fitting, welding, splined engagement, etc.

Figure 12:
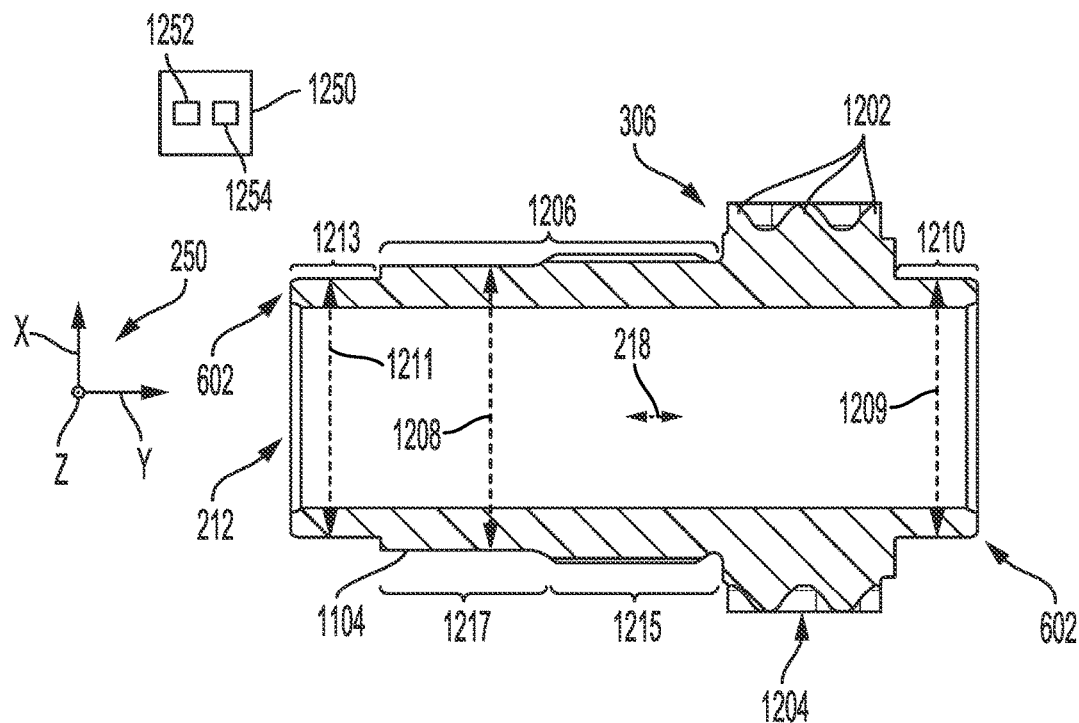
FIG. 12 shows a first manufacturing step of the intermediate shaft of FIG. 10, illustrating the manufacture of a fourth gear on the shaft.

In order to achieve the configuration shown in FIGS. 10-11, fabrication of the intermediate shaft may occur as described with respect to FIGS. 12-15. Steps described in FIGS. 12-15 may occur sequentially. Turning now to FIG. 12, a first step in a process for manufacturing a portion of the gear train 204 is illustrated. The intermediate shaft 212 may be a unitary, continuous structure formed of rigid, heat tolerant, durable material(s), such as steel, iron, aluminum, titanium, combinations thereof, etc. The intermediate shaft 212 may be constructed via machining, casting, forging, extrusion, combinations thereof, etc. Additionally, in one example, the intermediate shaft and the fourth gear may be jointly constructed. For example, the intermediate shaft may be cast or otherwise constructed with a flange and subsequently teeth may be cut into the flange to form the fourth gear. It will also be appreciated that the teeth in the fourth gear may be ground subsequent to cutting.

A shaft section 1206 extending axially along the intermediate shaft 212 is also depicted. The shaft section 1206 includes a portion of the outer surface 1104. The shaft section 1206 may have an outer diameter 1208 greater than an outer diameter 1209 of a first bearing journal 1210 and/or an outer diameter 1211 a second bearing journal 1213 on the intermediate shaft. The first and second bearing journals may serve as datums, in some embodiments. Specifically, in one use-case example, the first bearing journal 1210 may be used as a primary datum and the second bearing journal may be used as a secondary datum. However, in other use-case examples, the first bearing journal 1210 may be used a secondary datum. It will be understood, that the datums may be used for manufacturing procedures, such as gear grinding, gear cutting, etc., for example.

The shaft section 1206 includes a first portion 1215 and a second portion 1217. The first portion 1215 of the shaft section 1206 is shown having a larger diameter than the second portion 1217, however other shaft profiles have been envisioned. The first portion 1215 is profiled to mate with a section of the third gear 304 radially inward from the gear teeth and the second portion 1217 is designed to mate with an interior surface of the axial extension 1102, shown in FIG. 11. Further in one embodiment, the first portion 1215 may also include splines designed to mates with splines in the axial extension 1102 of the third gear 304, shown in FIG. 11. However, non-splined gear surfaces have also been contemplated.

Teeth 1202 may be cut and ground into an outer surface 1204 of the fourth gear 306 at an outer surface 1204 of the fourth gear 306. The outer surface 1204 has a greater outer diameter than the shaft section 1206. The teeth 1202 may be cut into the intermediate shaft 212 by processes such as broaching, milling, hobbing, shaping, etc. As previously discussed, the first bearing journal 1210 and/or the second bearing journal 1213 may be used as datums for tooth cutting. Consequently, a high gear accuracy may be achieved. After the teeth 1202 are cut, the teeth 1202 may then be ground, in one example. Further in some examples, techniques such as shaving, burnishing, honing, lapping, combinations thereof, etc. may be used to finish the gears. A geometry and placement of the teeth 1202 may be determined based on a positioning of the fourth gear 306 relative to bearing journals 1210 and 1213.

FIG. 12 also schematically illustrates a manufacturing machine 1250 including memory 1252 designed to hold instructions executable by a processor 1254. The machine 1250 may therefore be configured to hold, manipulate (e.g., axially translate, spin, etc.), etc. the gears and the intermediate shaft during the manufacturing process. The machine may also be configured to cut and/or grind gears, in certain examples. Furthermore, the machine may carry out the manufacturing process through automated, partially automated, or manual control schemes.

Figure 13:
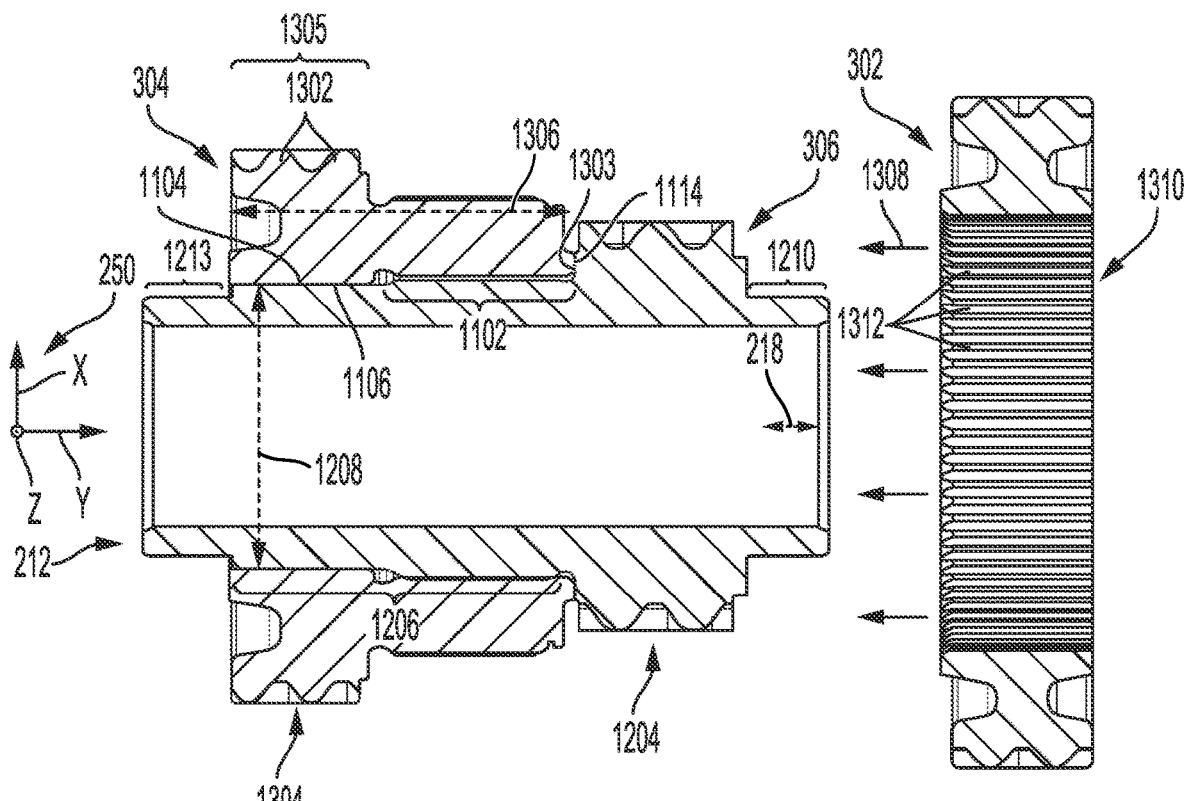
FIG. 13 shows a second manufacturing step of the intermediate shaft of FIG. 10, illustrating the incorporation of a third gear on the intermediate shaft.

Upon completion of formation of the teeth 1202 of the fourth gear 306, the third gear 304 may be added to the intermediate shaft 212, as shown in FIG. 13. The third gear 304 may be separately constructed in relation to the intermediate shaft 212 and fourth gear 306, via one of the methods described above. In some examples, teeth 1302 of the third gear 304 may be cut into an outer surface 1304 of a protruding section 1305 of the third gear 304 during fabrication of the third gear 304. In the illustrated example, the protruding section 1305 of the third gear 304 is adjacent (e.g., directly adjacent) to the axial extension 1102 of the third gear and has a greater outer diameter than the axial extension 1102. However, in another example, an intermediate section may be positioned between the teeth and the axial extension of the third gear. In such an example, the intermediate section may have a larger diameter than axial section and a smaller diameter than the outer surface of the teeth of the third gear.

The third gear 304 may be pressed onto the shaft section 1206 of the fourth gear 306 so that the terminal edge 1114 of the third gear 304 abuts a side surface 1303 of the fourth gear 306. However, in other examples, a gap may exist between the terminal edge 1114 of the third gear 304 and the side surface 1303 of the fourth gear 306. Additionally, the inner surface 1106 of the third gear 304 may be in face-sharing contact with the outer surface 1104 of the shaft section 1206. A press-fit interface may therefore be formed between the inner surface 1106 of the third gear 304 and the outer surface 1104 of the intermediate shaft 212, in one embodiment. As such, an inner diameter of the third gear 304 and the outer diameter of the intermediate shaft 212 at the shaft section may be sized for interference fitting. Further in some examples, a length 1306 of the third gear 304 may less than or substantially equal to a length of the shaft section 1206. If the teeth 1302 are not already cut into the outer surface 1304 of the third gear 304, the teeth 1302 of the third gear 304 may be cut once the third gear is pressed onto the shaft section 1206 of the fourth gear 306. However, in alternate examples, the teeth in the third gear may be cut prior to pressing the gear onto the intermediate shaft. Subsequently, the teeth 1302 of the third gear 304 may be ground. Both the cutting and grinding processes of the teeth in the third gear may be performed using the first bearing journal 1210 and/or the second bearing journal 1213 as datums.

During installation, the second gear 302 may pass over the outer surface 1204 of the fourth gear 306, as indicated by arrows 1308 in FIG. 13 and mated with the axial extension 1102 of the third gear 304. As one example, an inner surface 1310 the second gear 302 may include splines 1312 designed to engage with splines 1312 in the axial extension 1102 of the third gear 304. As such, the second gear 302 and the third gear 304 may be coupled via a splined interface (e.g., interference fit splined interface). The intermediate shaft 212 is shown in FIG. 14 with the second gear 302 mated with the axial extension 1102 of the third gear 304 and arranged axially between the third gear 304 and the fourth gear 306. The second gear 302 may be specifically located along the axial extension 1102 of the third gear 304 until a first edge 1402 of the second gear abuts a lip 1404 of the third gear 304. However, in other examples, a relatively small gap may exist between the first edge 1402 of the second gear 302 and the lip 1404 of the third gear 304.

An inner surface 1406, as shown in FIG. 14, of the second gear 302 may circumferentially surround the third gear 304 at the axial extension 1102. Additionally, an inner diameter 1407 of the second gear 302 may be greater than the outer diameter 1006 of the fourth gear 306, allowing the second gear 302 to pass readily over the fourth gear 306. In further examples, an inner diameter 1409 of a section of the third gear 304 may be greater than a diameter 1411 of the shaft portion 1217.

Teeth 1408 of the second gear 302 may be cut into an outer surface 1410 of the second gear 302 prior to installation of the second gear 302 over the axial extension 1102 of the third gear 304 or after installation. However, grinding of the teeth 1408 may be performed after the second gear 302 is pressed onto the third gear 304.

A position of the second gear 302 may be maintained by installing a snap ring 1420. The snap ring 1420 may have a slightly smaller inner diameter than the outer diameter 1413 of the axial extension 1102 of the third gear 304 but a larger outer diameter than the inner diameter 1409 of the second gear 302. When placed in a groove 1412 in the axial extension 1102 of the third gear 304, as shown in FIG. 15, a second edge 1502 of the second gear 302 may be adjacent to the snap ring 1420. Thus, the snap ring 1420 inhibits axial sliding of the second gear 302, along the y-axis. As such, the snap ring 1420 axially delimits the second gear 302.

In other examples, use of the snap ring 1420 may be precluded if the second gear 302 is welded or heated and pressed onto the third gear 304 before assembly of the gears onto the intermediate shaft 212. However, the snap ring 1420 may be a lower cost option for axially retaining the second gear 302.

The configuration of the intermediate shaft 212 allows of the electric drive axle system to be efficiently packaged with a reduced footprint. The second gear 302 is positioned between the third gear 304 and the fourth gear 306, and installed over the axial extension 1102 of the third gear 304. The arrangement of the gears on the intermediate shaft 212 allows the park gear 311 on the indexing shaft 910, shown in FIG. 9, to be located axially between the fifth gear 308 and the sixth gear 310 on the output shaft 214, shown in FIG. 9. This intermediate shaft gear configuration may also allow for packaging of the shift collar 906 in the indexing shaft 910, shown in FIG. 9. In this way, the gear train may achieve a space efficient layout. By manufacturing an intermediate shaft as described with reference to FIGS. 12-15, production costs of the intermediate shaft may be maintained low while providing high gearing accuracy.

The arrangement of the intermediate shaft depicted herein is provided as a non-limiting example of how the intermediate shaft may be configured to increase packaging efficiency of the electric drive axle system. In other examples, the position of the second gear may be instead switched with the third gear or the fourth gear, forgoing the need to press the second gear over the top of the fourth gear, if desired. However, such a modification may demand rearranging the fifth gear next to the sixth gear which may, in turn, add complexity to an arrangement of the indexing shaft and shift collar, as well as an actuator of the second clutch assembly 802 (e.g., wet friction clutch), shown in FIGS. 8 and 9.

A method 1600 for fabricating the intermediate shaft is shown in FIG. 16. The intermediate shaft may be the intermediate shaft included in the electric drive axle system 200, illustrated in FIGS. 2-15, or another suitable electric drive axle system. The method 1600 may be implemented by one or more machines such as machines configured for press-fitting, tooth cutting, tooth grinding, etc. The machines may include instructions stored in memory executable by a processor to implement the different steps. To elaborate, at least some of the method steps may be implemented as an automated machine process. However, in other examples, at least some of the steps may be implemented in response to user input or may be manually implemented via manufacturing personnel.

At 1602, the method includes forming a fourth gear on the intermediate shaft. Thus, in one example, the intermediate shaft may be formed (e.g., cast, machined, etc.) with a flange. Gear teeth may then be cut into the flange to form the fourth gear. Subsequently, the teeth of the fourth gear may be ground. In such an embodiment, the fourth gear and the intermediate shaft form a continuous structure. Additionally, the steps of cutting and/or grinding the fourth gear teeth may be performed relative to the bearing journals at either end of the intermediate shaft to increase gear accuracy.

At 1604, the method includes press-fitting the third gear onto the intermediate shaft. An interior surface of the third gear may therefore form a press fit interface with the outer surface of the intermediate shaft. Teeth may be cut into the third gear before or after coupling the third gear to the intermediate shaft. The teeth then may be ground after the third gear is pressed onto the intermediate shaft. Again, the teeth may be cut and/or ground relative to the bearing journals.

At 1606, the method includes installing the second gear onto the intermediate shaft, over the third gear. Therefore, in one example, the second gear, larger in size than both of the third and fourth gears, may be passed over the fourth gear and pressed onto an axial extension of the third gear. An interior surface of the second gear may include splines, allowing the second gear to be in splined engagement with the axial extension of the third gear. Further, in one example, the teeth in the fourth gear may be cut prior to installing the second gear on the intermediate shaft. However, in other examples, the fourth gear teeth may be cut subsequent to second gear installation. In either example, the teeth of the fourth gear may be ground subsequent to installation of the fourth gear on the intermediate shaft. Again, the second gear teeth may be cut and/or ground relative to the bearing journals the second gear may be held in place by a snap ring installed onto the axial extension of the third gear. Alternatively, the second gear may be welded onto the third gear. The method then ends.

The manufacturing methods described herein have the technical effect of providing a compact gear train layout with gears having a high amount of precision. Consequently, the gear train may be positioned in spaced constrained locations, if desired, gear train longevity can be increased, and NVH in the gear train can be reduced.

FIGS. 17-19 show the gear train 204 operating in different modes. As such, the gear train 204 may be placed in different operational modes via a controller, such as the controller 152, shown in FIG. 1. The modes may include a first gear mode where the first gear set 312, shown in FIG. 3, transfers rotational energy between the electric motor-generator 202 and the planetary gear assembly 222. The modes may also include a second gear mode where the second gear set 314, shown in FIG. 3, transfers rotational energy between the electric motor-generator 202 to the planetary gear assembly 222. The modalities may also be partitioned based on a reverse and forward drive motor arrangement. To elaborate, the electric motor-generator 202 may produce rotational output in a first direction corresponding to forward drive and may produce rotational output in a second direction opposing the first corresponding to reverse drive. As such, the gear train modalities may include a forward drive first gear mode, a reverse drive first gear mode, a forward drive second gear mode, and/or a reverse drive second gear mode. It will also be understood that the gear train may be operated in a regenerative mode where torque input from the drive wheels, such as the drive wheels 128 shown in FIG. 1, is transferred to the electric motor-generator and the electric motor-generator converts at least a portion of the drive train's rotational energy into electrical energy. In turn, in the regenerative mode the electric energy may be transferred from the motor-generator to an energy storage device, such as the energy storage device 108 shown in FIG. 1.

Turning to FIG. 17, illustrating the gear train 204 of the electric drive axle system 200 arranged in the forward drive first gear mode where the electric motor-generator 202 produces forward drive rotational output, the second clutch assembly 802 is disengaged, and the first clutch assembly 800 is engaged (e.g., configured to transfer energy from the fifth gear 308 to the output shaft 214 via the one-way clutch 902). The power path in the forward drive first gear mode of the gear train 204 is indicated via arrows 1700. Thus, in the forward drive first gear mode, rotational energy is transferred from the electric motor-generator 202 to the first gear 300, from the first gear to the second gear 302, from the fourth gear 306 to the fifth gear 308, from the fifth gear through the first clutch assembly 800 (e.g., through the one-way clutch 902) to the output shaft 214, from the output shaft to the planetary gear assembly 222, from the planetary gear assembly to the differential 224, and from the differential to the axle 838.

FIG. 18 shows the gear train 204 of the electric drive axle system 200 arranged in the forward drive second gear mode where the electric motor-generator 202 produces forward drive rotational output, the second clutch assembly 802 is engaged, and the first clutch assembly 800 is disengaged (e.g., the locking clutch 900 is disengaged and the one-way clutch 902 is overrun). It will be understood, that the one-way clutch 902 is overrun due to the ratio of the mesh between the third gear 304 and sixth gear 310 being lower than the ratio of the mesh between the fourth gear 306 and the fifth gear 308, resulting in no load being transferred between the fourth and fifth gear. The power path in the forward drive second gear mode of the gear train 204 is indicated via arrows 1800. Thus, in the forward drive second gear mode, rotational energy is transferred from the electric motor-generator 202 to the first gear 300, from the first gear to the second gear 302, from the third gear 304 to the sixth gear 310, from the sixth gear through the second clutch assembly 802 to the output shaft 214, from the output shaft to the planetary gear assembly 222, from the planetary gear assembly to the differential 224, and from the differential to the axle 838.

FIG. 19 shows the gear train 204 of the electric drive axle system 200 arranged in the regenerative first gear mode where the electric motor-generator 202 generates electrical energy from drive wheel torque transferred to the motor-generator through the gear train 204. Additionally, in the regenerative first gear mode the second clutch assembly 802 is disengaged, and the first clutch assembly 800 is engaged (e.g., configured to transfer energy from the fifth gear 308 to the output shaft 214 via the locking clutch 900). The power path in the regenerative first gear mode of the gear train 204 is indicated via arrows 1900. As such, in the regenerative first gear mode, rotational energy is transferred from the differential 224 to the planetary gear assembly 222, from the planetary gear assembly to the output shaft 214, from the output shaft to the fifth gear 308 through the first clutch assembly 800 (e.g., through the locking clutch 900 bypassing the one-way clutch 902), from the fifth gear to the fourth gear 306, from the second gear 302 to the first gear 300 and then to the electric motor-generator 202.

It will be appreciated that during a reverse first gear mode, the power path through the gear train 204 may be similar to the power path shown in FIG. 19. For instance, the power path in the reverse first gear mode may travel through the similar components to the power path denoted via arrows 1900. However, in the reverse power path the arrows are reversed. Therefore, in the reverse first gear mode the second clutch assembly 802 may be disengaged, and the first clutch assembly 800 may be engaged (e.g., configured to transfer torque from the fifth gear 308 to the output shaft 214 via the locking clutch 900).

FIGS. 1-15 and 17-19 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one embodiment, a gear train includes an input shaft configured to rotationally couple to an electric motor-generator and including a first gear, an intermediate shaft including, a second gear rotationally coupled to the first gear, and a third gear and a fourth gear each configured to rotationally couple to a separate gear on an output shaft, wherein the second gear, the third gear, and the fourth gear have different sizes, wherein the third gear includes an axial extension having at outer surface, and wherein an interior surface of the second gear circumferentially surrounds at least a portion of the outer surface of the axial extension. In a first example of the gear train, the second gear is positioned axially between the third gear and the fourth gear and where the second gear is larger than the third gear and the fourth gear. A second example of the gear train optionally includes the first example, and further includes, wherein an interior surface of the third gear forms a press fit interface with an outer surface of the intermediate shaft. A third example of the gear train optionally includes one or more of the first and second examples, and further includes, wherein the interior surface of the second gear is in splined engagement with the axial extension of the third gear. A fourth example of the gear train optionally includes one or more of the first through third examples, and further includes a shift collar arranged on the output shaft axially between a fifth gear rotationally coupled to the fourth gear and a sixth gear rotationally coupled to the third gear. A fifth example of the gear train optionally includes one or more of the first through fourth examples, and further includes a park gear arranged on the output shaft axially between the fifth gear and the sixth gear. A sixth example of the gear train optionally includes one or more of the first through fifth examples, and further includes, wherein the shift collar is included in a locking clutch configured to rotationally couple and decouple the fifth gear from the output shaft. A seventh example of the gear train optionally includes one or more of the first through sixth examples, and further includes, wherein the fourth gear is included in a first selectable gear set and the third gear is included in a second selectable gear set. An eighth example of the gear train optionally includes one or more of the first through seventh examples, and further includes, wherein the output shaft is rotationally coupled to a planetary gear set, the planetary gear set is directly rotationally coupled to a differential, and the differential is rotationally coupled to an axle. A ninth example of the gear train optionally includes one or more of the first through eighth examples, and further includes, wherein the axle is a beam axle. A tenth example of the gear train optionally includes one or more of the first through ninth examples, and further includes, wherein the second gear, the third gear, and the fourth gear are axially positioned between a pair of bearings coupled to opposing axial sides of the intermediate shaft.

In another embodiment, a method includes forming a first gear on an outer surface of an intermediate shaft in the gear train, press-fitting a second gear onto the intermediate shaft, and installing a third gear onto an axial section of the second gear, wherein the third gear is larger than the first gear and the second gear. In a first example of the method, teeth of the third gear are ground while the third gear is coupled to the axial section of the second gear. A second example of the method optionally includes the first example, and further includes, installing a snap ring onto the axial section of the second gear, where the snap ring axially delimits the second gear. A third example of the method optionally includes one or more of the first and second examples, and further includes, wherein installing the third gear onto the axial section includes welding the third gear onto the axial section of the second gear.

In yet another embodiment, a gear train includes an input shaft rotationally coupled to an electric motor-generator and including a first gear integrally formed with a body of the input shaft, and an intermediate shaft including, a second gear rotationally coupled to the first gear; and a third gear and a fourth gear each configured to rotationally couple to a distinct selectable gear on an output shaft, wherein the fourth gear is integrally formed on an outer surface of the intermediate shaft, wherein the third gear forms a press-fit interface with the intermediate shaft, wherein the second gear is positioned axially between the third gear and the fourth gear, and wherein the second gear is larger than the third gear and the fourth gear. In a first example of the gear train, a shift collar positioned on the output shaft axially between a fifth gear is rotationally coupled to the fourth gear and a sixth gear is rotationally coupled to the third gear, and a park gear positioned on the output shaft between the fifth gear and the sixth gear, wherein the shift collar is included in a locking clutch configured to rotationally couple and decouple the fifth gear from the output shaft. A second example of the gear train optionally includes the first example, and further includes, wherein the output shaft is rotationally coupled to a planetary gear set, the planetary gear set is coupled to a differential, and the differential is coupled to a beam axle. A third example of the gear train optionally includes one or more of the first and second examples, and further includes, wherein the second gear circumferentially surrounds an axial section of the third gear. A fourth example of the gear train optionally includes one or more of the first through third examples, and further includes, wherein the third gear and the fourth gear are each included in a distinct selectable gear set having different gear ratios.

In another representation, a gearbox is provided with an intermediate shaft including a larger gear positioned between two smaller gears on an intermediate shaft receiving torque from a gear on an input shaft coupled to an electric motor generator, where the smaller gears are rotationally coupled to a pair of gears on an output shaft and where an indexing shaft with a park gear and a shift sleeve is positioned axially between the pair of gears on the output shaft.

As used herein, the terms "approximately" and "substantially" are construed to mean plus or minus five percent of the range unless otherwise specified.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed electric axle system, comprising:
a second gear integrally formed with or mechanically attached to a portion of a body of a shaft and configured to mesh with a first gear;
a third gear press-fit and/or in splined engagement with a section of the shaft in a different axial position from the second gear; and
an inner surface of a fourth gear press-fit and/or in splined engagement with an axial extension of the third gear, wherein the fourth gear includes a toothed outer surface that is spaced away from the inner surface;
wherein the third gear and the fourth gear mesh with a fifth gear and a sixth gear, respectively; and
wherein at least one of the fifth gear and the sixth gear is coupled to a first clutch.

2. The multi-speed electric axle system of claim 1, wherein the fifth gear is coupled to the first clutch and the sixth gear is coupled to a second clutch.

3. The multi-speed electric axle system of claim 2, wherein the first clutch is a friction clutch and the second clutch is a one-way clutch.

4. The multi-speed electric axle system of claim 1, wherein the fifth gear and the sixth gear are arranged coaxial to an output shaft and an axle shaft.

5. The multi-speed electric axle system of claim 4, wherein the axle shaft is included in a beam axle.

6. The multi-speed electric axle system of claim 4, wherein a planetary gearset is coupled to the output shaft and a differential.

7. The multi-speed electric axle system of claim 1, wherein the shaft is axially offset from a rotational axis of a motor-generator.

8. The multi-speed electric axle system of claim 1, wherein the fourth gear interposes the second gear and the third gear.

9. The multi-speed electric axle system of claim 1, further comprising a first bearing and a second bearing coupled to axially opposing sides of the shaft.

10. The multi-speed electric axle system of claim 9, wherein the first and second bearings are tapered roller bearings.

11. A multi-speed electric beam axle system comprising:
a first shaft rotationally coupled to an electric motor and including a first gear that is integrally formed with or mechanically attached to a body of the first shaft; and
a second shaft coaxially arranged with a second gear, a third gear, and a fourth gear;
wherein the second gear meshes with the first gear;
wherein one of the second gear, the third gear, and the fourth gear is integrally formed with the second shaft;
wherein an inner surface in at least one of the second gear, the third gear, and the fourth gear is press-fit and/or in splined engagement with the second shaft; and
wherein an inner surface in one of the second gear, the third gear, and the fourth gear is in splined engagement and/or press-fit with another one of the second gear, the third gear, and the fourth gear, and wherein the inner surface is spaced away from a toothed outer surface.

12. The multi-speed electric beam axle system of claim 11, wherein:
the third gear and the fourth gear are each configured to mesh with a distinct gear on a third shaft;
the third shaft includes a first clutch and a second clutch coupled thereto; and
the first clutch and the second clutch are coupled to gears that mesh with the third gear and the fourth gear, respectively.

13. The multi-speed electric beam axle system of claim 12, wherein the first clutch is a friction clutch and the second clutch is a one-way clutch.

14. The multi-speed electric beam axle system of claim 12, wherein the third shaft include a central opening and wherein an axle shaft extends through the central opening.

15. The multi-speed electric beam axle system of claim 11, further comprising a planetary gearset coupled to the second shaft and directly coupled to a differential.

16. The multi-speed electric beam axle system of claim 15, wherein the differential is position on one lateral side of the electric motor.

17. The multi-speed electric beam axle system of claim 11, wherein the electric motor is an electric motor-generator.

18. The multi-speed electric beam axle system of claim 11, further comprising a pair of bearings coupled to axially opposing sides of the second shaft outboard from the second gear, the third gear, and the fourth gear.

19. The multi-speed electric beam axle system of claim 11, wherein a rotational axis of the electric motor and a rotational axis of the first shaft are coaxial to one another.

20. A multi-speed electric beam axle system comprising:
a first shaft rotationally coupled to an electric motor and including a first gear that is integrally formed with or mechanically attached to a body of the first shaft;
a second shaft coaxially arranged with a second gear, a third gear, and a fourth gear; and
a pair of bearings coupled to axially opposing sides of the second shaft outboard from the second gear, the third gear, and the fourth gear;
wherein the second gear meshes with the first gear;
wherein one of the second gear, the third gear, and the fourth gear is integrally formed with the second shaft;

wherein at least one of the second gear, the third gear, and the fourth gear is press-fit and/or in splined engagement with the second shaft;

wherein one of the second gear, the third gear, and the fourth gear is in splined engagement and/or press-fit with another one of the second gear, the third gear, and the fourth gear; and wherein the second gear is positioned axially between the third gear and the fourth gear.

* * * * *